United States Patent [19]
Habisreitinger et al.

[11] Patent Number: 6,001,198
[45] Date of Patent: Dec. 14, 1999

[54] PROCESS AND APPARATUS FOR THE APPLICATION OF SELF-ADHESIVE PROTECTIVE FILM TO VEHICLE BODIES

[75] Inventors: Uwe Habisreitinger, Freudenstadt; Bernhard Nordmann, Boeblingen, both of Germany

[73] Assignee: DaimlerChrysler AG, Germany

[21] Appl. No.: 08/953,641

[22] Filed: Oct. 17, 1997

[30] Foreign Application Priority Data

Oct. 17, 1996 [DE] Germany .............................. 196 42 831
May 23, 1997 [DE] Germany .......................... 296 22 887 U
Jun. 7, 1997 [DE] Germany .............................. 197 24 040

[51] Int. Cl.$^6$ .................................................. B32B 31/00
[52] U.S. Cl. ............................ 156/64; 156/212; 156/216; 156/353; 156/378; 226/15; 226/45; 364/474.37
[58] Field of Search ............................... 156/82, 212, 221, 156/256, 351, 353, 355, 64, 216, 391, 361, 486, 487, 529, 378; 364/474.01, 474.02, 474.03, 474.29–474.34, 474.37; 242/563.1, 563; 226/15, 18, 19, 20, 45

[56] References Cited

U.S. PATENT DOCUMENTS

| | | | |
|---|---|---|---|
| 4,180,075 | 12/1979 | Marinoff | 128/305 |
| 4,465,915 | 8/1984 | Roder | 219/121 LG |
| 4,511,426 | 4/1985 | Linner | 156/497 |
| 5,461,770 | 10/1995 | Kimura | 29/527.7 |
| 5,792,290 | 8/1998 | Huber | 156/64 |

FOREIGN PATENT DOCUMENTS

| | | |
|---|---|---|
| 42 34 712 A1 | 4/1994 | Germany . |
| 6-156339 | 3/1994 | Japan . |
| 7-90235 | 4/1995 | Japan . |

*Primary Examiner*—David A. Simmons
*Assistant Examiner*—George R Koch, III
*Attorney, Agent, or Firm*—Evenson, McKeown, Edwards & Lenahan, P.L.L.C.

[57] ABSTRACT

A method and apparatus for cutting through protective film in the region of covered-over joints and beads of vehicle bodies includes a freely programmable industrial robot having at least five degrees of motional freedom. An operating arm of the robot has a cutting and pressing tool which includes a knife having a blade for cutting through the protective film in the region of covered-over joints and beads, and the pressing tool comprises a rotary brush or air nozzle for pressing down the cut edges. In another embodiment, an air nozzle which emits a diffuse hot-air current is provided for cutting through the protective film.

26 Claims, 16 Drawing Sheets

PROCESS AND APPARATUS FOR THE APPLICATION OF SELF-ADHESIVE PROTECTIVE FILM TO VEHICLE BODIES

BACKGROUND AND SUMMARY OF THE INVENTION

This application claims the priority of German Application No. 196 42 831.9, filed Oct. 17, 1996, German Application No. 296 22 887.7, filed May 23, 1997, and German Application No. 197 24 040.2, filed Jun. 7, 1997, the disclosures of which are expressly incorporated by reference herein.

The invention relates to a process and apparatus for the application of self-adhesive protective film to vehicle bodies.

In the mass-production operation of a large number of passenger vehicle manufacturers, the vehicles must be prepared for dispatch in such a way that they do not suffer damage, in particular that the paintwork is not adversely affected by storage and weather influences. Where rail journeys or even ship transports are necessary for conveyance to the customer, the vehicles have been coated for this purpose with a protective layer of wax, which has had to be removed prior to customer delivery. The residue-free removal of the protective wax was not only a labour-intensive task, but also placed a strain upon man and the environment due to the solvent used therein. For this reason, there has recently been a move to protect vehicle bodies during transport by using self-adhesive films, though it has only been the essentially horizontal surface sections of the body, which are susceptible to damage by weather and by deposits, which have been protected in this way. Because this type of protection is not only very effective but also relatively dear, it has been provided not only as protection during transport but also as protection during vehicle assembly and consequently the protective film has been applied even before the final vehicle assembly, i.e. directly after the painting of the body.

The protective film is intended to be applied, as far as possible, in a crease-free and bubble-free manner, since, after a certain storage period, a microclimate can form under creases or bubbles, which, depending on paint type and colour, can sometimes result in visible marks. In order to be able to apply the protective films carefully, the film cuts had previously to be held by several persons, brought over the vehicle, aligned and placed against the associated surface sections. Despite the high expenditure of labour, creases and bubbles could not always be avoided in the application of the protective film.

When the regions for add-on parts were subsequently cut free, this often resulted in damage to the paintwork, thereby necessitating costly refinishing works. In the previous manual application of the protective film, the procedure was as follows: firstly, a rectangular piece of a protective film, which had been matched in size to a surface section, was drawn off and cut off from a feed roll by at least one or two persons, and the trailing end was held and cut off by one or two additional persons. This protective film piece was freely tensioned by as many as four persons in freehand manipulation with the self-adhesive side pointing downwards, brought in this way over the body, lowered there in positionally correct fashion in horizontal position onto the associated surface section, placed against it more or less free from creases and bubbles and pressed down by smoothing with a soft, slidable item, e.g. a stiffened piece of felt.

In the region of covered-over gaps between adjoining body parts such as wings or doors, the protective film was cut through manually with a knife and the cut edges pressed down by hand in order to shape the way in which assembly-relevant work was carried out. In order to be able to cut free and recess assembly-conforming holes in the protective film in the region of add-on parts such as roof trim rails, sliding roof cover, radiator figurine, windscreen washer nozzles, antennae, windscreen surrounds or the like, a flat, strip-shaped template was previously placed in positionally correct fashion onto the body and the protective film to be applied likewise stuck onto this, so that at the regions to be cut free not only was the film held at a slight distance from the body surface but also, as a result of the template, a cutting and guide edge for a knife is formed, along which the film can be cut through in conformity with the contour. Despite constant practice, the handling of a sharp-edged knife just a short distance from the painted body surface has repeatedly resulted, amidst the hustle and bustle, in paint damage and costly refinishing work. Particularly in body forms having, for example, beads in the region of the hood, the portion of film spanning the bead could previously be manually cut through only after a strip of film had been placed underneath, since there was too great a risk of paint damage in the region of the bead.

One object of the invention is to improve the application process and the corresponding appliance such that the monotonous manual work can be replaced by mechanization, the quality of the application in terms of freedom from bubbles and creases in the applied protective film, together with the avoidance of paint damage, can be improved and, moreover, savings can be made in labour costs.

Another object of the present invention is to provide a process for cutting through protective film in the region of stuck-over joints and beads, especially of passenger vehicle bodies, which helps to prevent paint damage and, moreover, offers possible savings in labor costs.

These and other objects and advantages are achieved by the method and apparatus according to the invention, in which a measured rectangular piece of a protective film is drawn off from a feed roll on the non-adhesive side using a robot-guided tensioning frame, preferably with suction arms, is drawn off and cut off from the feed roll. Before the film cut is placed against the body, while the film is stretched on the tensioning frame (which can be handled like a rigid workpiece) tear lines are perforated in the region of add-on parts, from the non-adhesive side of the film, using a heated serrated disc which is mechanically guided along defined contour lines. (Such performated tear lines allow specific areas of the film to be removed during the assembly process by tearing them off along the performations.)

Subsequently, the protective film, which has been thus prepared and tensioned in a crease-free manner in the tensioning frame, is lowered by the handling robots onto the associated surface section, placed in the correct position, free from bubbles, and pressed down with a smoothing bar. All surface sections are thereby successively covered over. In the region of add-on parts, protective film parts are drawn off along the perforated tear lines, and assembly-conforming holes are thus formed in these regions. Also, in the region of joints and beads which have been covered over, the film, according to the invention, is cut through by means of a robot-guided knife, the cut edges being pressed down, for example, using a rotary brush or an air nozzle.

The apparatus according to the invention is distinguished by a freely programmable industrial robot (cutting robot) having at least five degrees of motional freedom, and having an operating arm to which a cutting and pressing tool is fitted. As the cutting tool, a knife having a blade for cutting through the protective film in the region of covered-over joints and beads is provided. For pressing down the cut edges of the protective film, a suitable pressing tool is provided, which is disposed downstream of the cutting tool in the cutting and motion direction. According to the invention, the pressing tool is either a rotary brush, which can be placed onto the body is parts lined with the protective film, or an air nozzle, which is directed at the cut edges and the (preferably diffuse) air jet of which presses down the edges.

The use of the cutting robot ensures precise guidance of the knife for cutting through the protective film, so that the risk of paint damage is substantially reduced. In the region of a stuck-over joint or bead, the cutting robot thrusts the knife blade disposed on its operating arm through the protective film and moves the knife in the cutting direction predetermined by the joint or bead, up to the point where the end of the joint or bead is reached. As a result of the rotary brush, which is disposed behind the knife and which is placed directly (or through the lowering of the operating arm) on the body part lined with protective film, the cut edges of the cut-through protective film are pressed down onto the body, thereby precluding any detachment of the film due to protective film edges which fail to adhere to the body. In another embodiment of the invention, the cut edges are pressed down onto the body by means of an air nozzle disposed behind the knife, which emits a diffuse air current directed at the protective film.

In one design of the invention, the flat sides of the knife blade respectively have a plastic coating. Such a coating serves to prevent damage to the painted body through contact of the hard blade material with the paintwork if the knife-guidance direction should deviate slightly from the alignment of the joint. The plastic applied to both sides of the blade should have good sliding characteristics in relation to hardened vehicle paints and in relation to the protective film to be applied.

In a further design of the invention, the knife is elastically suspended in the cutting and pressing tool, transversely to the cutting and motion direction, by means of a leaf spring. As a result of this design according to the invention, inaccuracies between the robot-guidance of the knife and the actual course of the body joint or bead are compensated, since the knife, in the event of a lateral contact with the body part limiting the joint, can elastically "veer away". Advantageously, adjustable stop arms are provided to act upon the knife and/or the leaf spring, transversely to the cutting and motion direction, so that when the protective film is pierced, the stop arms serve to fix the knife. Following the insertion of the knife and during the cutting operation, the action of the stop arms upon the knife and the leaf spring is lifted, so that the desired elasticity takes effect whenever the knife comes into lateral contact with body parts.

In a particularly advantageous design of the invention, the knife is rearwardly pivotable, so that if during the cutting operation, it encounters an unforeseen obstacle in the cutting direction, it is pivoted rearwards in the cutting direction. This pivoting is detected by a suitable sensor and provokes an immediate withdrawal of the knife or of the operating arm of the cutting robot, so that an unforeseen and undesirable obstacle by which the knife is confronted in its cutting path does not bring the production line to a halt. Rather, the cutting robot travels to the next body joint or bead and systematically cuts it open. Protective films which have not been properly cut through are then treated in a downstream manual checking station. Alternatively, the cutting robot, after the knife is withdrawn, can skip the site of the obstacle and, beyond the obstacle, re-insert the knife into the protective film above the joint to be cut free, so as to continue with the cutting.

In a particularly advantageous design, the knife is disposed on a biaxial floating slide such that it is adjustable perpendicularly to the film plane and transversely to the cutting and motion direction. The floating slide is disposed, for its part, on the operating arm of the robot and allows, during a "search travel" prior to the commencement of the cutting operation, a fine adjustment of the knife in the z-direction (perpendicularly to the film plane). Following completion of this search travel, the z-floating slide is fixed and the knife is extended, either by movement of the operating arm of the cutting robot perpendicularly to the film plane or by direct extension of the knife. Immediately thereafter, the cutting operation is performed, with inaccuracies between the robot-guided cutting path of the knife and the body joint being compensated by the z-floating slide.

In an advantageous design, the cutting and pressing tool can be moved into a variety of operating settings and a measuring device is assigned to it, for registering within the working space of the cutting robot the actual position of those joints or beads of the body which are to be cut free.

The measuring device may be, for example, a measuring tool disposed on the cutting and pressing tool. In this case, the cutting and pressing tool can be swivelled into a variety of operating settings: in a first swivel setting the measuring tool is operative, and in a second swivel setting the cutting and pressing tool is operative. The measuring tool can advantageously comprise optical and/or acoustic sensors, by means of which the exact position of the gap to be cut free can be detected. As soon as the actual position of the gap has been determined, the cutting and pressing tool is pivoted so that the knife is aligned to the detected actual position of the gap and the cutting operation can commence.

In another design of the invention, a tactile probe which is adjustable on a biaxial floating slide perpendicularly to the film plane and transversely to the cutting and motion direction is provided as the measuring device. This probe can be lowered by the robot arm and/or directly onto the body, whereby the z-floating slide is deflected (perpendicularly to the film plane). The robot next performs with the tactile probe a motion running essentially transversely to the alignment of the joint. As soon as the probe is located in the joint gap, as the robot continues its travel, the y-floating slide is deflected (transversely to the cutting and motion direction), whereupon the probe remains in the gap. Following completion of the search travel, the z-floating slide is fixed. Armed with this knowledge of the actual position of the joint to be cut free, the knife can now be brought into the starting position for the cutting operation.

In a particularly advantageous design of the invention, the knife is disposed on the biaxial floating slide holding the probe, and the probe and the knife are adjustable perpendicularly to the film plane. Following completion of the search travel, the knife can thus easily be extended, whereby it pierces the protective film covering the gap, and the probe is retracted. In this manner, the cutting operation commences through the robot-guidance of the knife.

In another design of the invention, a tactile probe which is pivotable transversely to the cutting and motion direction is provided as the cutting device. In this design of the invention, the probe follows a search travel path which is essentially transverse to the gap to be cut, and is deflected as soon as it enters into the joint gap. The deflection is detected by means of a suitable sensor, and a signal is transmitted to the cutting robot, which stores the deflection point as a point of insertion for the knife. After having been stored, a deflection which has once been detected or an ascertained deflection path can also be used for an adjacent body joint or bead.

In one design of the invention, the tactile probe has a rounded feeler tip, and in another design it has a probe tip with a feeler roll matched to the gap.

In a further embodiment of the invention, a device for cutting through protective film in the region of covered-over joints and beads has an operating arm of the cutting robot with a cutting and pressing tool in the form of an air nozzle, which is suitable for a diffuse emission of hot air. The temperature of the hot air is set, for example, at least to the melting temperature of the plastic of the protective film. The appliance according to the invention allows the protective film to be cut through in a contact-free manner in the region of covered-over joints and beads. As a result of the hot air, the plastic of the protective film begins to melt, and is cut through in the region of a joint or bead by the pulse of the air current striking it. The particular advantage of this contact-free cutting resides in the fact that no additional pressing tool is necessary to press down the cut edges of the protective film, since the cut edges are already pressed down onto the body by the air current issuing from the air nozzle. Since the hot air is emitted from the air nozzle (that is, the air jet is directed not at a point, but only over an area, it is not absolutely necessary to provide a measuring device for fine alignment of the air nozzle. That is, any small deviations of the gap from the actual position are compensated by the diffuse air current.

In one design of the invention, a pin made from a material offering good heat conductivity is disposed in the region in front of the air-discharge opening of the air nozzle. This pin can advantageously be extended and serves to cut through the protective film, especially in the region of wide beads, whenever the pulse applied by the air current to the protective film, because of the width of the gap lying beneath the film, is insufficient to cut through this film.

Other objects, advantages and novel features of the present invention will become apparent from the following detailed description of the invention when considered in conjunction with the accompanying drawings.

DETAILED DESCRIPTION OF THE DRAWINGS

Before discussing in detail the device for the automated lining of the body, it is worth firstly more closely describing, with reference to the drawings, the process according to the invention for the application of film.

The self-adhesive protective film 23 supplied in feed rolls 21 (FIG. 3) is applied in automated operation to specific, preferably the horizontal, surface sections of passenger vehicle bodies 1 in conventional notchback version. It is certainly possible, in principle, to apply the protective film to the ready-assembled vehicle or even at any other chosen point during the final vehicle assembly. Since however, even during assembly, the applied protective film already offers the paintwork certain protection from assembly-induced damage, according to the represented illustrative embodiment the protective film is applied to the freshly painted bodies 1, which then pass with the protective film into the final assembly. The lateral faces of doors, preferably of the front doors, which are particularly frequently used during assembly, and especially of the driver's door, can also advantageously be lined. Whether the protective film is now applied before, during or after assembly, assembly-conforming holes must in any event be cut in the film at locations of add-on parts.

Figure 10:
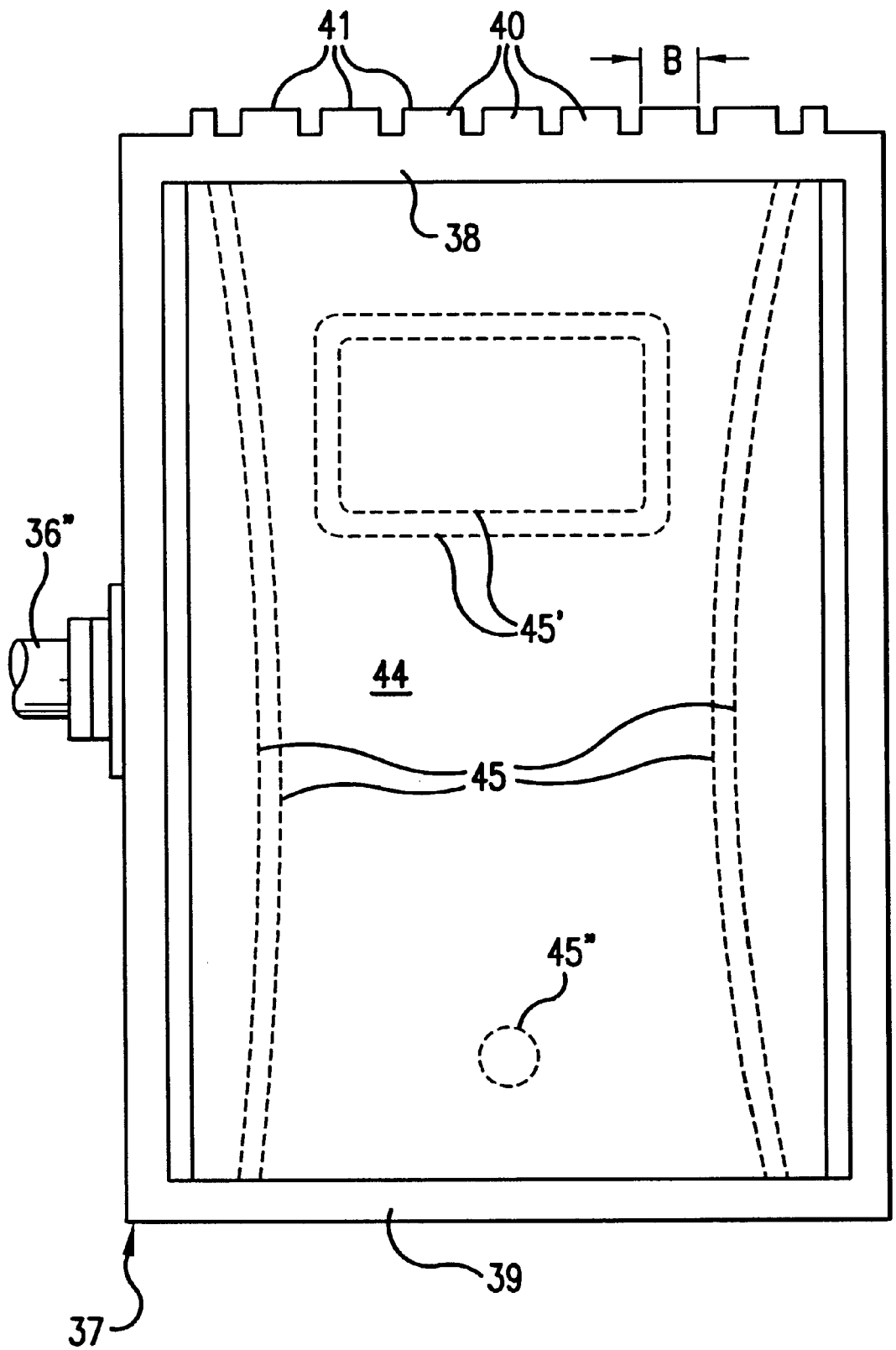
FIG. 10 shows a film cut, tensioned in a tensioning frame, exhibiting various perforation lines which have been formed therein.

For automated film application, a dimensioned film piece 44 is drawn off from the film feed by a robot-guided tensioning frame 37 (FIG. 1) and taken up free from creases and under a certain natural tension into the tensioning frame (FIG. 10). Into this film piece or "cut" (which is tensioned and, thanks to the tensioning frame, can be handled almost like a rigid workpiece), prior to film application, perforation lines are made in the correct position, using a robot-guided perforation tool. Such perforation lines allow specific regions of film to be removed, as dictated by the assembly, by being torn off along the perforation lines. It is only afterwards that the film cut provided with the perforation lines is lowered by the tensioning frame robot onto the associated surface section of the body in the correct position, and pressed down onto it in a crease-free and bubble-free manner.

Figure 6:
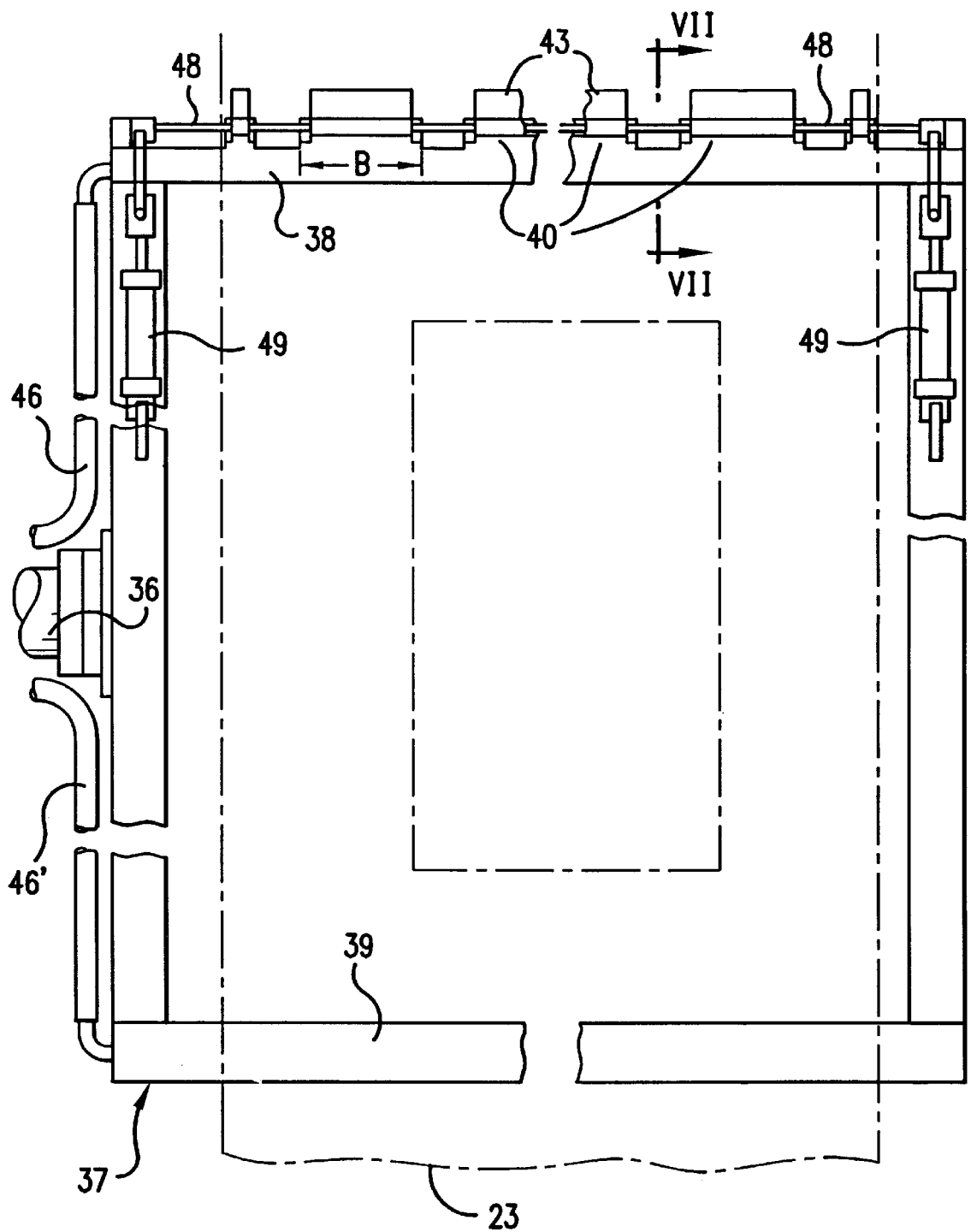
FIG. 6 shows a robot-guided tensioning frame for the automated handling of a film cut taken from the film feed.

In detail, the following process steps are provided: The leading end of the protective film 23 emanating from the feed roll 21 is positionally defined and secured and supplied in a crease-free manner in such a way that the film end 26 is at least partially accessible on the non-adhesive side 24. As it is drawn off, the protective film 23 is constantly antistatically treated in a freely tensioned strand, so that the film cuts can subsequently be placed in fault-free manner onto the body surface, including into the marginal region. The aforementioned feed-side end of the protective film is taken up on its non-adhesive side by the first suction bar 38 (FIGS. 6, 10), which is located on the tensioning frame side and is guided by the tensioning frame robot in the draw-off direction a, and by the detachment of the film from the supply fixture.

A rectangular piece of a protective film, which has been matched in size to a surface section, is now drawn off from the feed roll 21 and tensioned for as long as the film draw-off piece remains attached to the film feed. A trailing, second suction bar 39 of the tensioning frame 37 takes up position on the non-adhesive side of the tensioned protective film and there too secures the film through the use of a connected-up vacuum. The drawn-off film draw-off piece is thereby clamped in the tensioning frame and, at the same time, a new feed-side film end is re-secured to the supply fixture. Suitable constructional measures in the unwinding of the protective film serve to ensure that the protective film is drawn off from the feed roll at a constant tension, despite different adhesion of the film layers of the winding one upon the other and despite a different winding diameter. A transversely running knife cuts the drawn-off film piece, already secured in the tensioning frame, off from the film feed.

Figure 9:
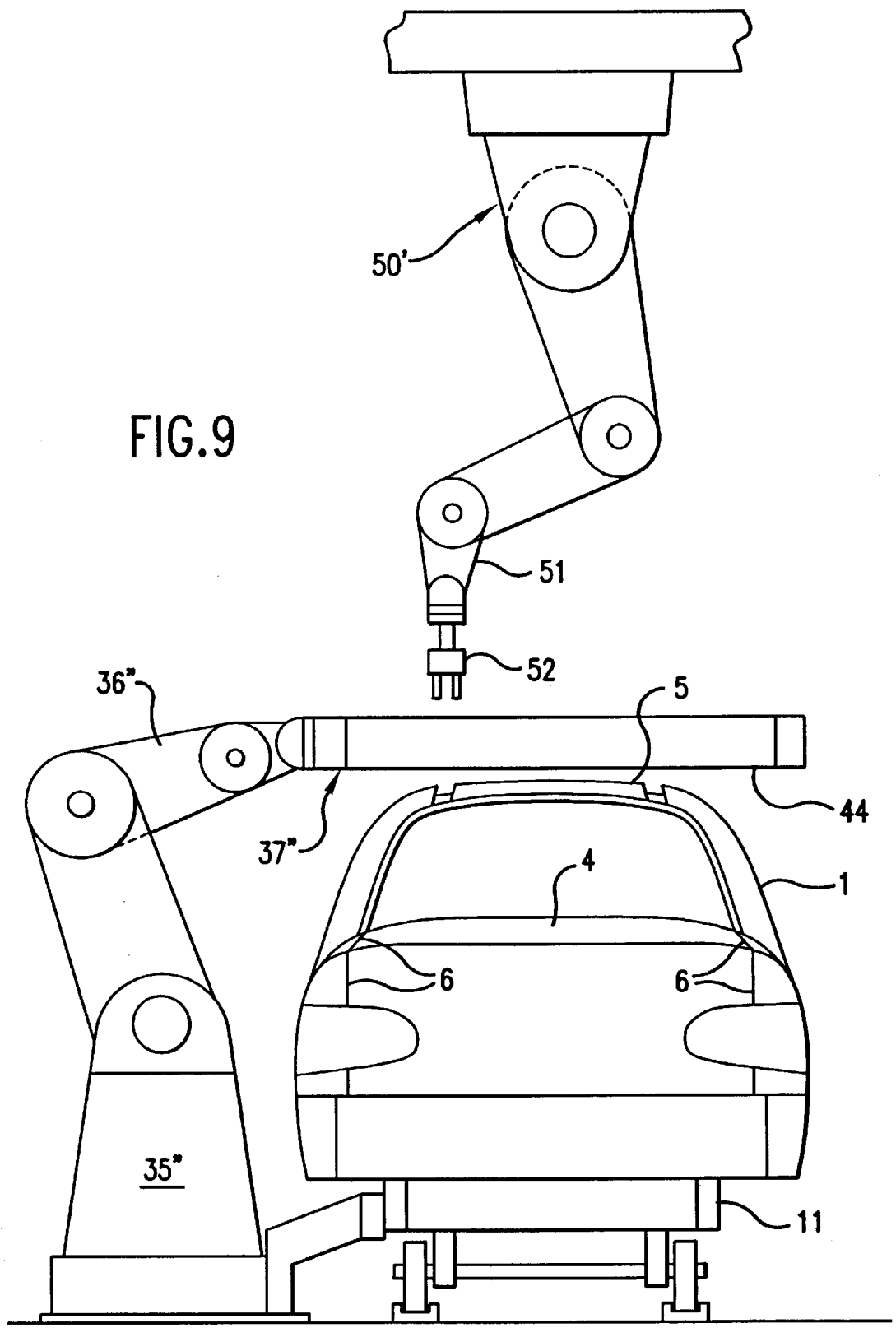
FIG. 9 shows a longitudinal view of the station for the lining of the roof, at the stage in which the film cut which has been held ready for use in tensioned state in the tensioning frame is worked on by the suspended perforation robot.

The tensioning frame robot 35 (FIGS. 1, 2 and 9) holds out the now freely movable film cut 44 in a work-correct and positionally defined manner to the perforation robot 50 (FIG. 2), which perforates the necessary tear lines 45, 45', 45" (FIG. 10) into the freely tensioned film from the non-adhesive film side, using a heated serrated disc 55 or a heated, crown-like perforation stamp.

Figure 8:
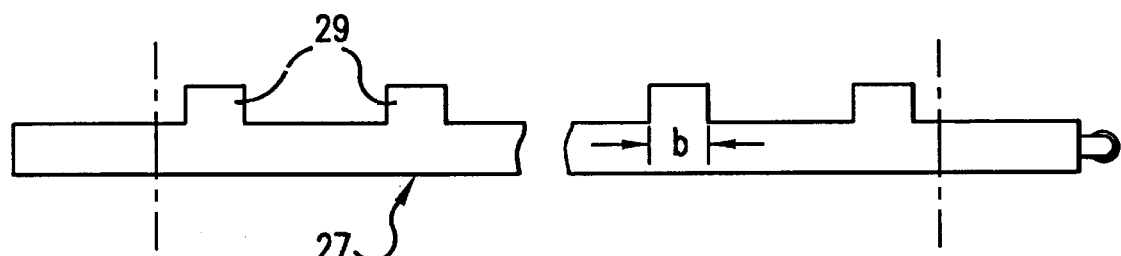
FIG. 8 shows the suction bar of the rolling device for securing the leading end of the film in positionally correct opposition to the leading suction bar of the tensioning frame according to FIG. 6.
Figure 15:
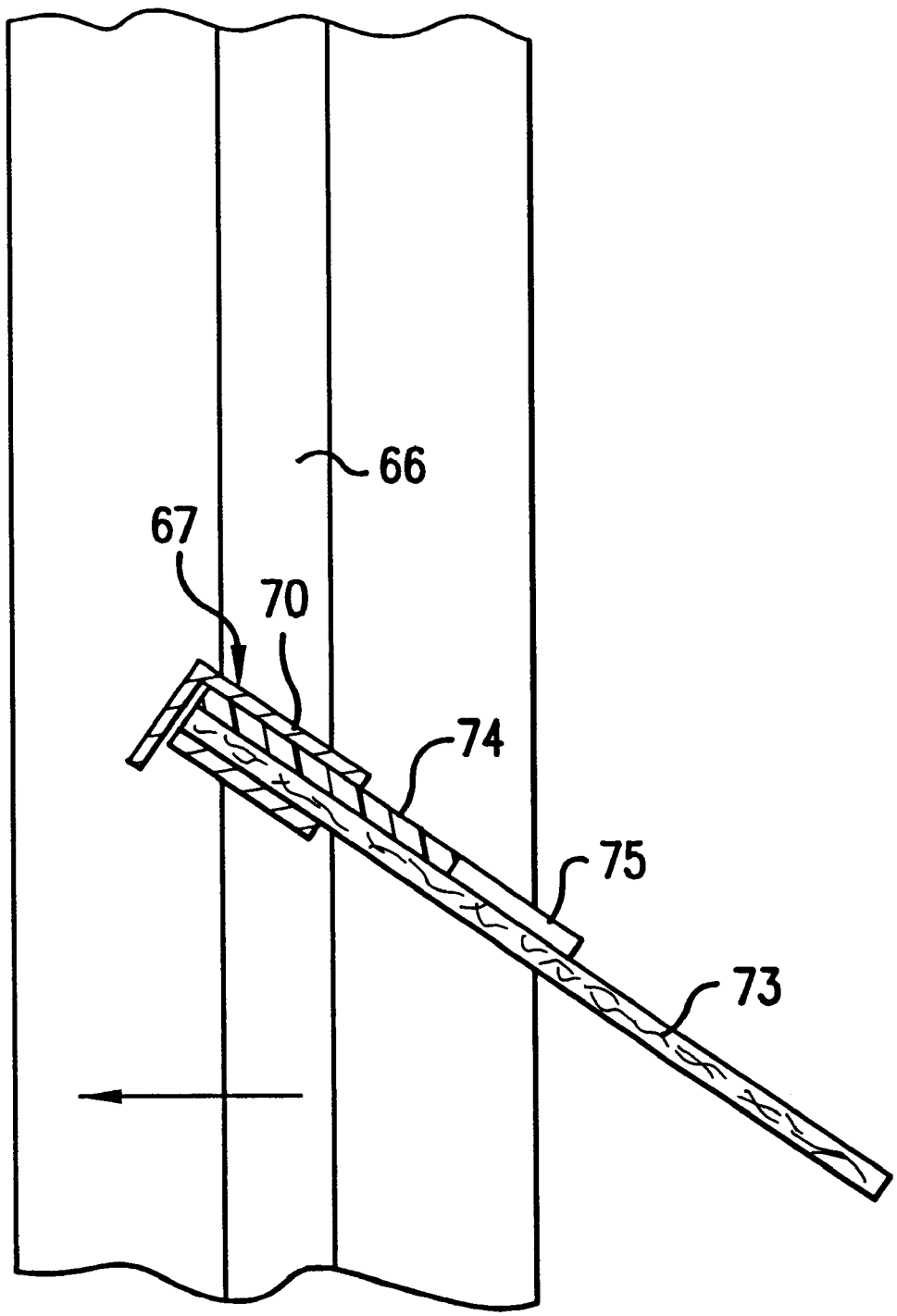
FIG. 15 shows a cross-section through the smoothing bar of the gantry according to FIG. 14, along the sectional line XV—XV.

The film cut which has been thus pre-treated is now aligned by the tensioning frame robot 35 to the associated surface section 3, 4, 5 of the body 1 (FIG. 8) supplied in a positionally defined manner, is lowered and laid onto it in the tensioned and perforated state. As the film is placed against the arched body surface, the tension of the film cut, which is secured by the edge, is increased. To prevent the film cut from beginning to tear at the perforation lines, the marginal clamping is reduced in this delivery phase to a lower value, so that the film edge can slide out of the marginal clamping given that the tensile force in the film cut is low. The protective film is then pressed down by means of a slidable and elastic smoothing bar 67 (FIG. 15). Expediently, all the surface sections to be protected are firstly loosely lined with protective film and then all film portions pressed down in a uniform operation.

Figure 16:
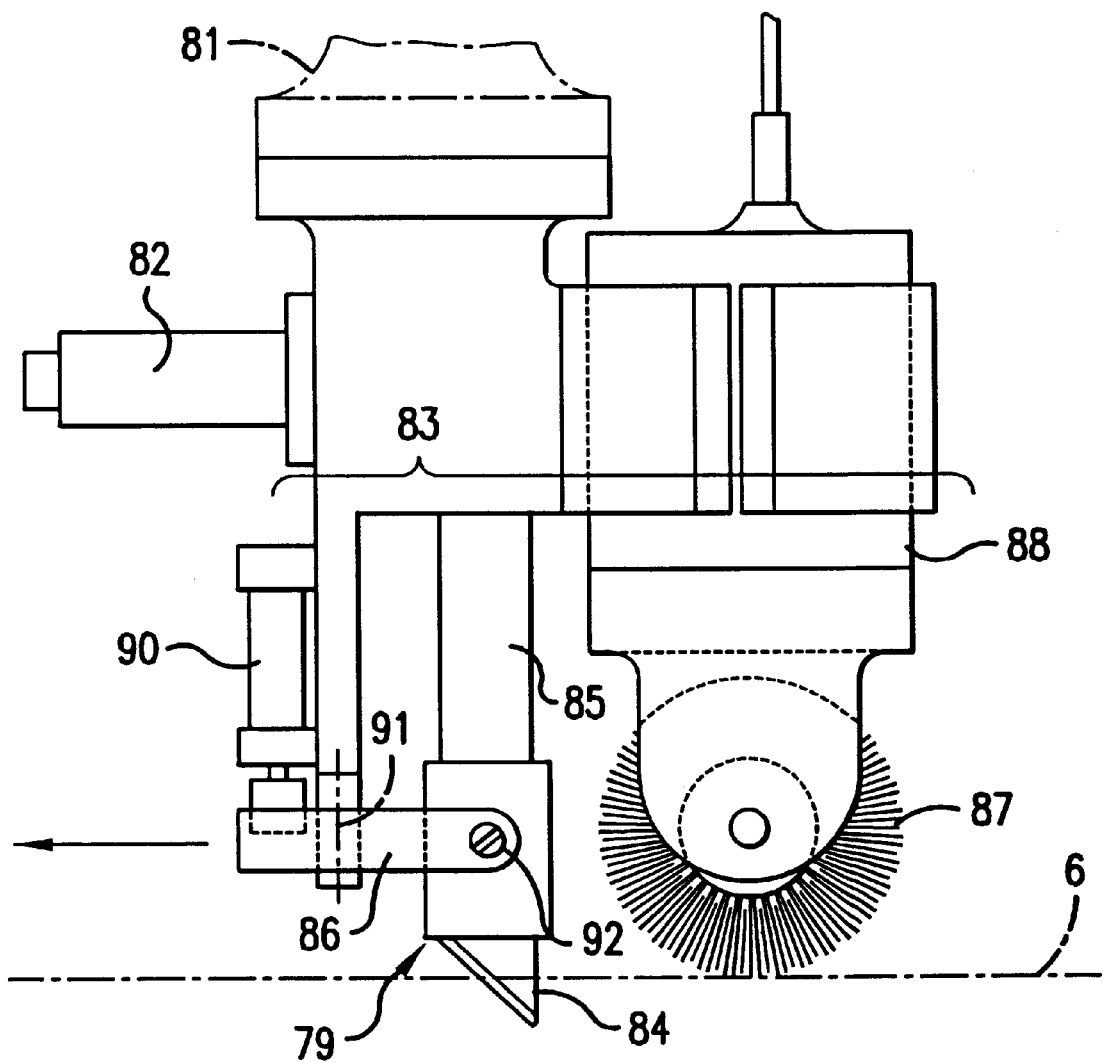
FIG. 16 shows a side view of a robot-guided double-action tool for measuring position and cutting free the joints and also for pressing down the edges of the protective film.
Figure 17A:
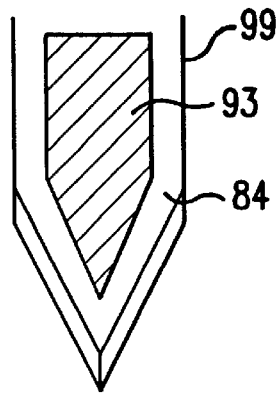
FIG. 17a shows an enlarged lateral representation of a knife blade partially coated with plastic.
Figure 17B:
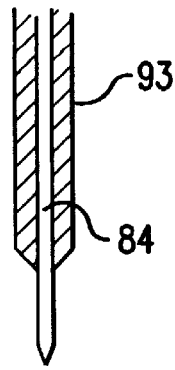
FIG. 17b shows the knife blade of FIG. 17a in frontal view.
Figure 17C:
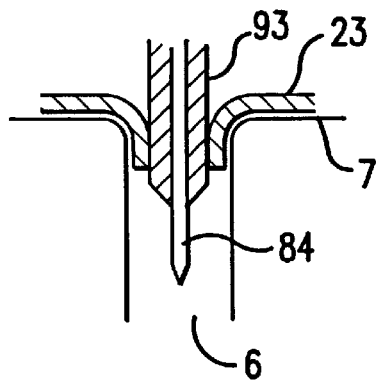
FIG. 17c shows the knife blade of FIG. 17b as the protective film is cut through in the region of a stuck-over joint.

In the region of covered-over joints 6 (FIGS. 9, 17c, etc.), the film can be cut through by means of a robot-guided knife, the cut edges being pressed down with a rotary brush 87 (FIG. 16). Those protective film parts in the region of add-on parts, which get in the way in the subsequent assembly, are drawn off—preferably manually—along the perforated tear lines.

With a view to a simple and residue-free removal of the protective film after use (for example, upon delivery of the vehicle to the customer), the adhesive property of the adhesive side 25 of the protective film is deliberately designed to be less by comparison with normal contact-adhesive strips of packaging technology. In order however to prevent the protective film from becoming loose during travel (test: runs and short transfer journeys during manufacture) as a consequence of the slipstream, those edges of the protective film which are at the fore in the direction of travel are separately secured by a transversely running adhesive strip of relatively high adherence. After the protective film has been fully applied, these securing strips are fitted in one of the after-connected manual work stations 17. In those cases in which the film cut, at the longitudinal edges of the protective film, has to be secured to the body with a securing strip (that is, when lining the doors) it is also conceivable to bring together these securing strips identically with the protective film on the roll stand and to handle and apply this film composite jointly.

Once a very large amount of protective film is consumed in a mass-production film coating of vehicle bodies, it is expedient to provide for an automatic roll change in the roll stands for the protective film and to dimension the feed rolls in such a size (that is, to wind on such a quantity of protective film in a respective feed roll) that one feed roll proves sufficient for the requirements of a full work shift.

Figure 1:
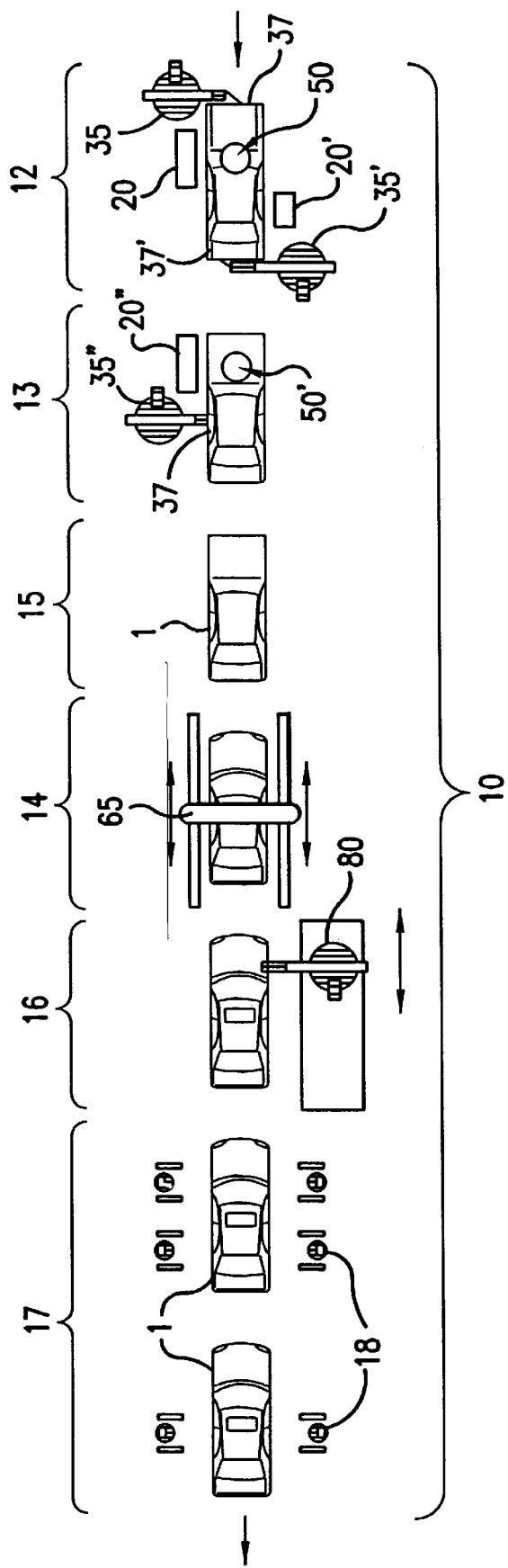
FIG. 1 shows the layout of a production line for the automated, mass-production of passenger vehicles in top view.

The production line 10 represented in FIG. 1, for the automated, mass-production lining of passenger vehicles, has a plurality of work stations 12 to 17, interlinked in transport terms, through which the bodies 1 which are to be lined and which are fastened in a positionally defined manner on conveyor slides 11, are rhythmically conveyed. In the individual work stations 12, 13, 14 and 16 (FIG. 2) in which work is performed automatically, the bodies are fixed in a positionally defined manner, indirectly via the conveyor slides and fixing devices provided in the stations, within a specific tolerance field. Situated therebetween are work stations encompassing works to be manually performed, in which a defined fixing of position is not necessary. The individual work stations are spaced apart by the length of a body plus a motional play and safety region.

Figure 2:
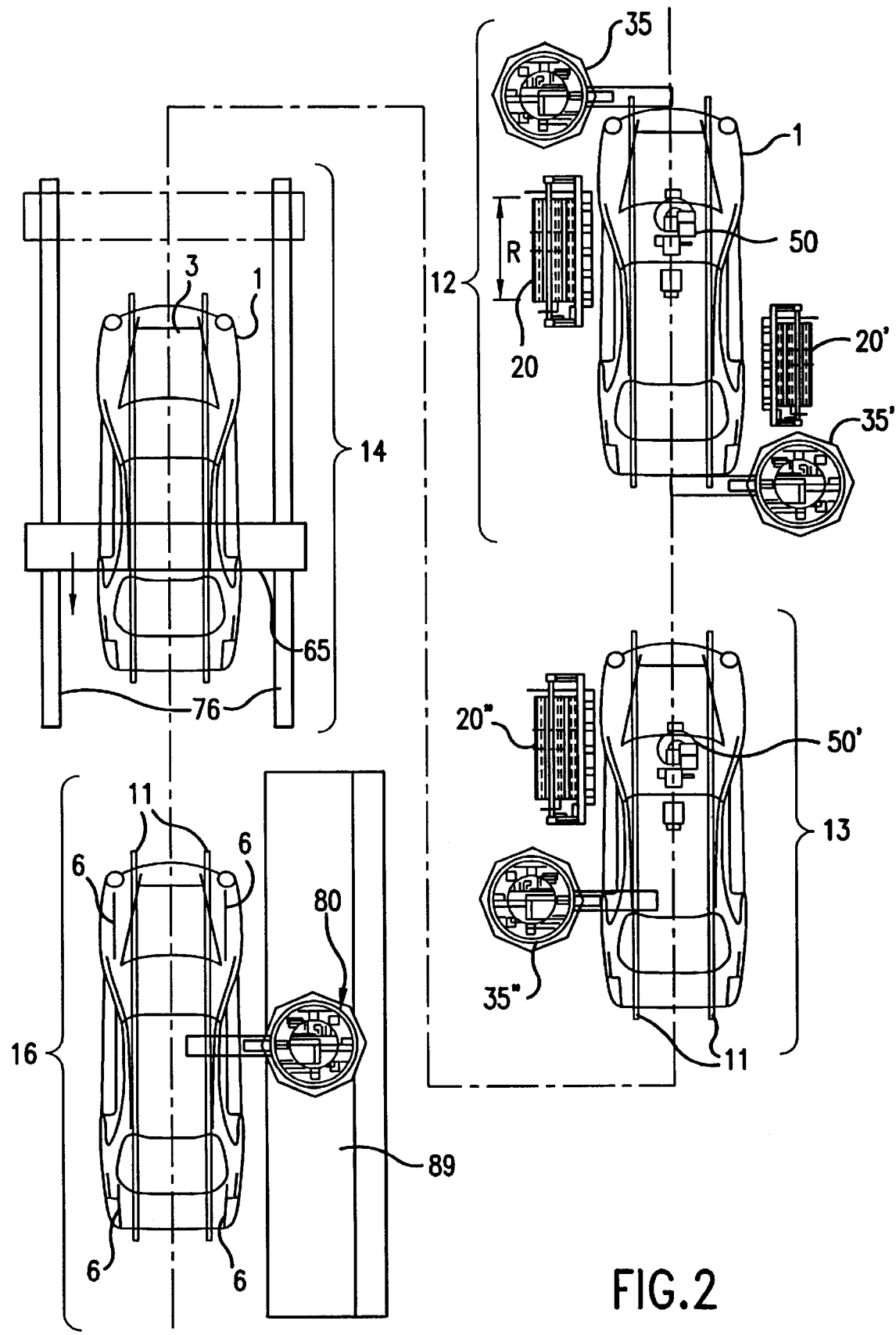
FIG. 2 shows an enlarged detail of the basic work stations of the production line according to FIG. 1, likewise in Lop view.
Figure 3:
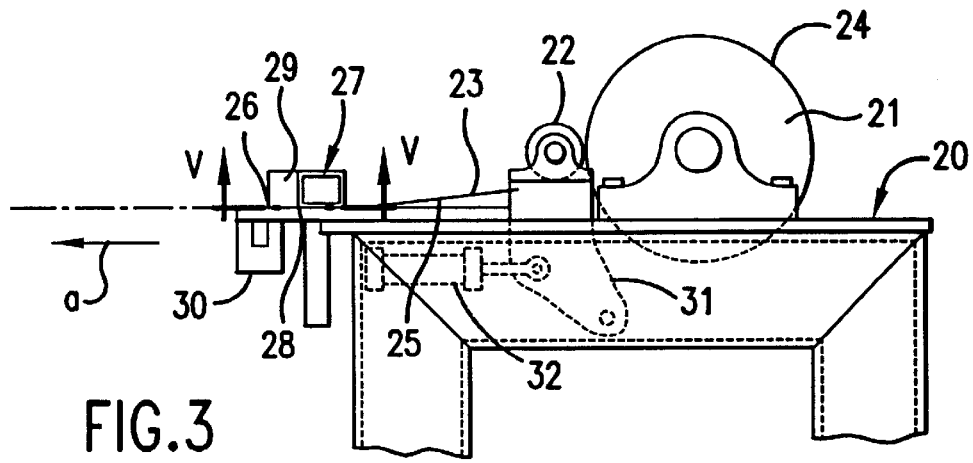
FIGS. 3 and 4 show side and top views, respectively of a device for holding a protective film ready for use in conformity with requirements and for drawing it off from a feed roll.

The notchback body contains a plurality of horizontal surface sections, namely the hood 3 with adjoining parts of the wings, rear lid 4, likewise with adjoining wing regions, and the roof 5. The protective film 23 which is to be applied thereto is supplied in feed rolls 21 of different width R, which are mounted in a finishing-correct manner in corresponding roll stands 20, 20', 20" (FIGS. 1, 2). In the horizontally mounted feed roll 21, the non-adhesive side 24 points outwards. Following a deflection of the protective film drawn off from the feed roll by a small, movably mounted deflection roller—compensating roller 22—the protective film is guided to a suction bar 27, which holds the film end 26 on its non-adhesive side, with the adhesive side 25 pointing downwards (FIG. 3).

The protective film, for various reasons, is more or less heavily statically charged, which is a hindrance to automated finishing and film application. The protective film, as it is drawn off from the feed roll, therefore receives an antistatic treatment. This can be achieved by a grounded contact rod made from electrically conductive material, which bears transversely across the whole of the film width on the non-adhesive side. In order also to be able even to remove heavier electric charges rapidly from the protective film, ionized air, which compensates the charge of the film, can be blown onto the protective film.

Experience shows that the inner layers within the winding composite of the feed roll adhere more firmly together than do the outer winding layers, which increases the draw-off tension as the feed roll diminishes. On the other hand, the protective film is intended to be taken up into the tensioning frame with constant film tension. To compensate for possible disturbing influences, the aforementioned compensating roller 22 is provided, which is mounted in radially movable arrangement—in relation to the feed roll 21—on a rocker arm 31 and can be pressed down with adjustable force onto the circumference of the feed roll by means of a pressure cylinder 32. In addition, the compensating roller 22 can be retarded by means of a brake (not represented) with an adjustable brake torque. Such a brake can be accommodated (e.g. as an axially pressurized multiple-disc brake or as a cone brake, inside the compensating roller). On the one hand, because of the adjustable force by which the compensating roller is pressed down against the feed roll and, on the other hand, because of the torque by which it is retarded, a constant-level draw-off force and hence a constant delivery tension is ensured in the protective film, regardless of changes in the diameter and layer adhesion of the feed roll. Good preconditions can thereby be created for a constant final application Df the protective film.

In terms of their size, the feed rolls are advantageously designed to meet the requirements of a full work shift, so that only one roll change is necessary per shift. In addition, a device for an automatic roll change is provided, which is configured such that, as the last film piece of the old feed roll is used up, the new feed roll, which has been kept in readiness, is automatically adopted and its leading film end placed upon the suction bar 27. Such a roll-change device is not however shown in the represented illustrative embodiment. It is therefore merely worth mentioning that, in place of the fixed single mounting of the one feed roll 21, there is respectively provided on both sides in the roll stand a centrally mounted rocker arm, at whose ends a respective feed roll is rotatably mounted. of these two feed rolls, the one is positioned in the usage position—as represented in the example—whereas the other feed roll is kept in readiness retracted by the length of the rocker arm. Furthermore, in the device for an automated delivery of the film end to the suction bar 27, a shackle is provided which swings together with the rocker arm and which extends with a rod over the roll width. For the preparation of an automatic roll change, the film end is placed with the adhesive side of the protective film manually against this rod. As the roll change takes place, this shackle is then swivelled up to the suction bar 27 from below, whereupon the latter takes up the film end of the new feed roll.

Depending on production numbers per shift and depending on the cycle time in respect of the film application, feed rolls sufficient for one work shift are so heavy that they can no longer be deposited or handled on their outer circumference, because the films would otherwise acquire pressure points and the windings would acquire flat points, which would impair proper finishing. Rather, film rolls of this particular weight and diameter (the film width has here no critical influence) must always be mounted in the centre on a special harness and stored in separate cradles. To this end, the rolls must be supplied complete with a metal winding spindle, which stays with the roll from the manufacture of the winding to the consumption of the roll and has to be returned to the manufacturer after the roll has been used up.

The roll stands are disposed in the two lining stations 12 and 13 for the hood and rear lid and for the roof respectively. For each surface section 3, 4, 5 to be lined, a tensioning frame robot 35, 35', 35" is additionally respectively provided, which has the usual six motional axes and is freely programmable. The roll stand 20 and tensioning frame robot 35 for the hood 3, on the one hand, and the roll stand 20' and tensioning frame robot 35' for the rear lid 4, on the other hand, are disposed in the same work station 12. For the film application to the roof 5, a separate work station 13 is provided. In each lining work station 12 and 13, there is respectively disposed a further freely programmable, preferably six-axis perforation robot 50 and 50' respectively. For reasons of space, furthermore, these are disposed in such a way above the body 1 that the working space of the perforation robot ends up lying roughly in the middle of the work station. To this end, the perforation robot can be suspended from the ceiling structure of the hangar or from a gantry, or it can be mounted on the side of a vertical assembly surface (for example on the wall of the hangar, on a pylon rising up from the hangar floor or on a bracket fastened to the hangar ceiling or hangar wall).

Figure 5:
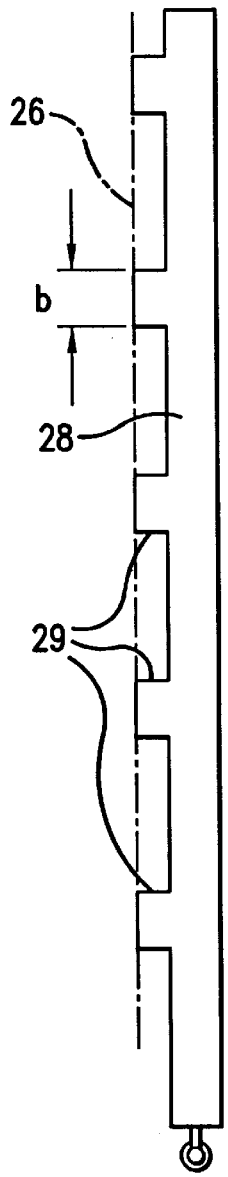
FIG. 5 shows a single representation of a suction bar from the device according to FIGS. 3 and 4 for securing the leading end of the film, with a direction of view onto the suctioning side of the suction bar, which lies normally at the bottom.

At the roll stands, the leading end 26 of the protective film 23 is supplied and secured by the suction bar 27 such that it is positionally defined and free from creases and such that the film end is at least partially accessible on the non-adhesive side 24. (See FIG. 3.) The stand-sidle suction bar is pierced on its bottom side 28 (FIG. 5) and can be evacuated, or indeed ventilated, in a suctioning manner, so that the adhesive effect of the suction bar can be cancelled as required and in a timely manner. That edge of the suction bar which points in the draw-off direction a of the film has a crenellated contour, the projections 29 also being pierced to suctioning effect on the bottom side. The protective film is thereby safely secured right up to the film end 26, while the immediate film end remains accessible on the top side in the region between the projections 29.

In the immediate vicinity of the suction bar 27, there is further provided an appliance 30 for cutting off drawn-off protective film at a right-angle. This cut-off appliance essentially comprises a guide bar which runs transversely to the film web, in which a knife is mechanically guided, and which is driven, for example, by means of a pneumatic cylinder via a Bowden cable. A single transverse movement of the knife in the guide bar causes a drawn-off film. piece to be securely cut off from the film feed at the suction bar. Because the protective film must be cut through with low cutting force (without the risk of creasing), knife wear must be taken into account. For this reason, a simple and rapid knife change must be guaranteed by appropriate structural design. An automatable knife change or a knife offering increased tool life, by virtue of better knife material and/or by virtue of a displaceable blade offering increased wearing material stock (displaceable long blade or twistable circular knife), could also be of advantage.

The tensioning frame robots 35, 35', 35" (FIGS. 1, 2 and 9) support on their operating arms 36, 36', 36" a rectangular tensioning frame 37 matched to the size of the surface section 3, 4, 5 to be lined. As shown in FIG. 10, the tensioning frame has a leading suction bar 38 and a trailing suction bar 39, disposed on two opposing longitudinal sides, to secure a film cut 44. The individual suction bars can be connected up or ventilated via separate vacuum lines 46 and 46' respectively.

The leading suction bar 38 of the tensioning frame, viewed in the draw-off direction a, likewise has on its longitudinal side pointing away from the inside of the frame a crenellated contour which fits the crenellated contour of the stand-side suction bar 27. More precisely, the projections 40 of the tensioning frame suction bar 38 can be inserted between the gaps in the stand-side suction bar 27 to the point where they touch the protective film 23. On the leading suction bar 38, only the face sides 41 of the projections have suctioning holes and are able to be subjected to underpressure. As the film is taken up, the face sides of these frame-side projections are lowered between the projections of the stand-side suction bar 27 and brought into contact with the accessible regions of the film end 26, whereby the film end is taken up by the tensioning frame 37.

Figure 4:
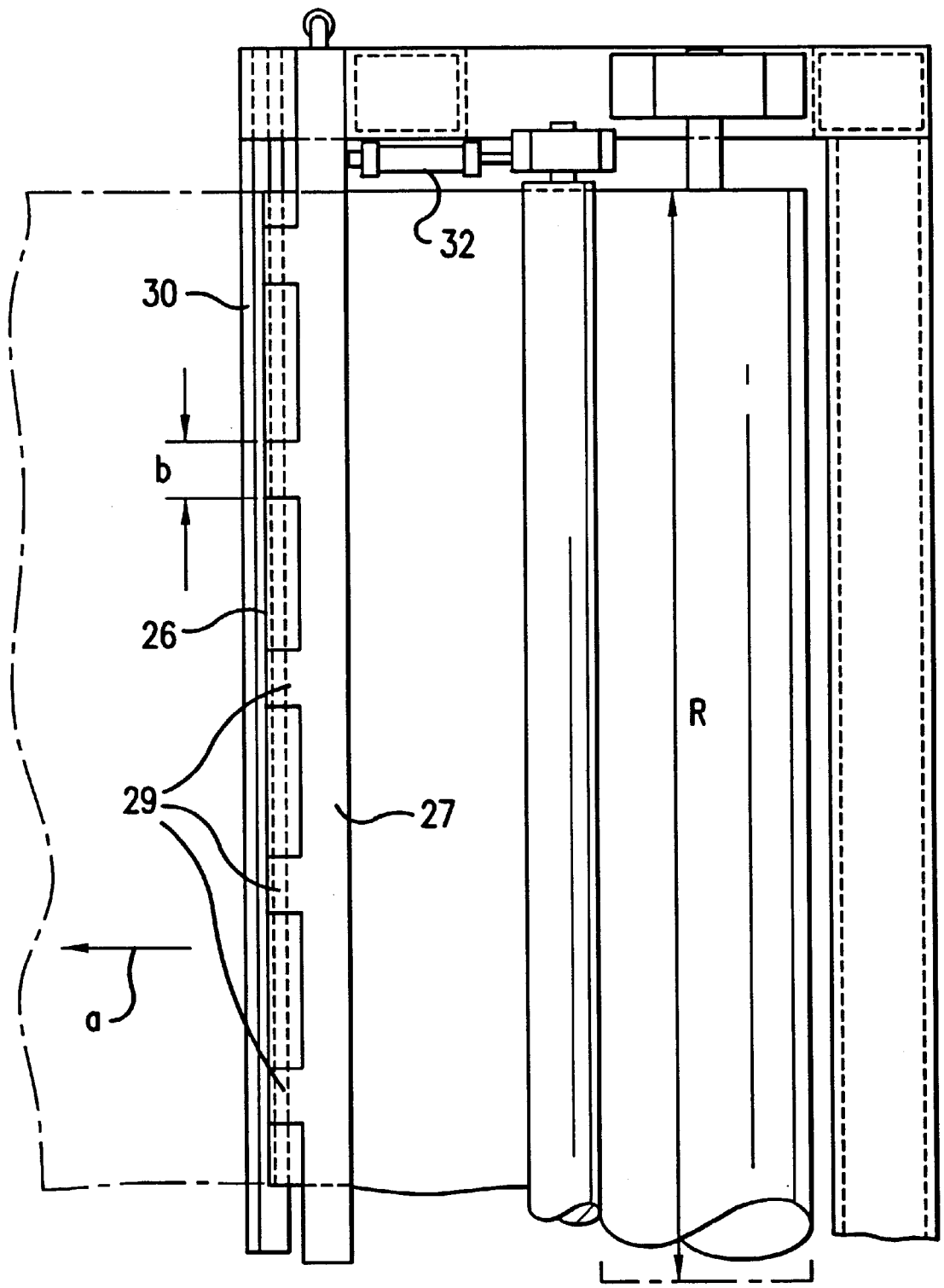

As shown in FIG. 4, the projections 29 of the stand-side suction bar 27 are narrower (width b) than the projections 40 of the tensioning frame suction bar 38, which are configured with a width B (FIG. 10). The narrow projections need only to secure the film end such that it is free from creases, whereas the wide projections 40 of the tensioning frame suction bar have to transmit from the feed roll the high draw-off forces of the self-adhesive protective film. In order to increase the pneumatic retention force of the tensioning frame suction bars, the bores in the retaining faces are countersunk on the contact side over a wide area. It should here be borne in mind that the film, because of the self-adhesion, can only be drawn off from the feed roll 21 if a high degree of force is applied. In order to secure the film end safely to the tensioning frame suction bar 38 during draw-off, the latter is provided with pivotable gripping means 43 (FIG. 6) for the additional gripping of the protective film. The flaplike gripping means—driven by swivel cylinders 49—are pivotable about a swivel axis 48 and can be placed, pretensioned, against the face side 41 of the projections 40, which face side can be subjected to underpressure.

For the take-up of a film cut 44 from the roll stand 20, the tensioning frame 37 is applied transversely to the protective film 23, (in the example vertically), with the leading suction bar 38 against the protective film and the stand-side suction bar 27 in such a way that the face 41 of the frame-side projections 40 enters between the gaps in the stand-side suction bar and come to bear against the non-adhesive side 24 of the film. The leading suction bar is now evacuated and the gripping means are closed, so that they are placed against the adhesive side 25 of the received film end. The stand-side suction bar 27 is now ventilated, so that the film end is freed. Through parallel progression of the leading suction bar 38 of the tensioning frame away from the stand 20 by means of the tensioning frame robot 35, a measured length of film is drawn off from the roll 21, the tensioning frame being simultaneously swivelled in the direction of the horizontal, so that, towards the end of the draw-off and swivel motion, the trailing suction bar of the tensioning frame is also placed against the film. In this state, the second frame-side suction bar 39 and the stand-side suction bar 27 are tightly spaced one beside the other. The two adjacent suction bars—as long as the film remains under the tension of the draw-off—are evacuated and afterwards the cut-off appliance 30 is actuated, so that a film cut 44 is tensioned in the tensioning frame 37 and is taken up by the tensioning frame. As the film is cut through, the film is safely secured on the near side and far side of the cut-off appliance 30 by suction bars 38 and 27, so that the force influence of the moved film-cutting knife does not pose any risk of creasing. Once the cut is complete, a new film end 26 stands ready on the stand-side suction bar 27, positionally defined and free from creases, for a repetition of the process.

It can never fully be precluded, in practical operation, that the tensioning frame robot 36 might at some time collide somewhere with the bulky tensioning frame 37, especially during the robot set-up phase or whenever any maintenance works are carried out in the plant. Minor collisions are generally harmlessly withstood by the robot and essentially also by the tensioning frame, but the tensioning frame can be distorted by a small collision. In order to be able to compensate for such minor deformations, the suction bars 38 and 39 are held adjustably on the tensioning frame. They are adjustable in terms of parallelism to one another and to the desired plane of the tensioning frame and, for this purpose, must be adjustable in relation to at least two spatial directions. Moreover, the flat sides of the two suction bars, which are critical to the film position, must be able to be set in mutual alignment; the circumferential position therefore must also be adjustable to a certain degree. This type of multiple adjustability of the tensioning frame suction bars is not however represented in the drawings. Should major damage ever be suffered by the tensioning frame— irrespective of the nature or cause—then the whole of the tensioning frame must be able to be quickly exchanged to prevent the occurrence of any lengthy production stoppages. All mechanical connections between tensioning frame and robot arm and all lines must therefore be able to be rapidly disconnected and re-closed. Naturally, for such a damage or repair instance, a proper tensioning frame with all accessories must be kept ready, positionally defined, in the access region of the tensioning frame robot.

So that, towards the end of the film cut delivery phase from the tensioning frame to the curved body surface, the mechanical tension in the film does not become too great, and the risk of a film tear along the perforation lines is prevented, provision is made for the film edge to slide out of the edge mounting of the film. In the case of the suction bars 38 and 39, this is realized by a stepped lowering of the adhesion vacuum or underpressure. More precisely, the suction chambers of the suction bars are only partially ventilated through a by-pass line, which can be ordered open according to schedule, but still remain connected to the vacuum source, so that external air can enter and an underpressure with reduced adhesive effect is created in the suction bar. By appropriate dimensioning of the by-pass cross-section, the adhesive effect in the film delivery phase can be influenced such that the film edge, as long as the film tension remains tolerable, slides down from the suction bar.

The perforation robots 50, 50', disposed in the lining stations 12 and 13 with their working space roughly in the middle of and above the body, support on their working arm 51 (FIG. 9), a perforation tool for forming perforated tear lines 45, 45', 45" (FIG. 10) in the film piece 44, which is held tensioned by the tensioning frame robot. For this purpose, the perforation tool 52 has at least one circular serrated disc 55, which is mounted so as to be freely rotatable, is toothed on its outer circumference and is made from metal, preferably from a non-corroding steel, having a thickness of about 1 to 2 mm. The toothed outer circumference of the serrated disc protrudes between glide shoes 56, which are held thermally insulated and which, as the protective film 44 is being perforated, slide along on it and limit the depth of penetration T of the serrated disc into the protective film. (See FIG. 12.)

In the remaining region, the serrated disc is surrounded with slight axial play by heat-conducting and heated material of the perforation tool, thereby enabling thermal energy to be transmitted across these zones into the serrated disc. In the region behind the serrated disc, a heating appliance 57 in the form of a heating cartridge is disposed in the perforation tool for the controlled, temperature-precise heating of the serrated disc. By way of example, the serrated disc is intended to be heated to a constant temperature within the range from 120 to 180° C., with a temperature fluctuation of ±2 degrees. The optimal level of the serrated disc temperature is dependent upon the film characteristics (material and thickness) and upon the working speed, and must in individual instances be empirically refined. In the illustrative embodiment according to FIGS. 10 and 11, the perforation tool is configured as a tandem tool having two serrated discs disposed side by side in parallel. Two equidistantly running perforation lines 45, 45' are thereby able to be synchronously introduced into the protective film.

Figure 13:
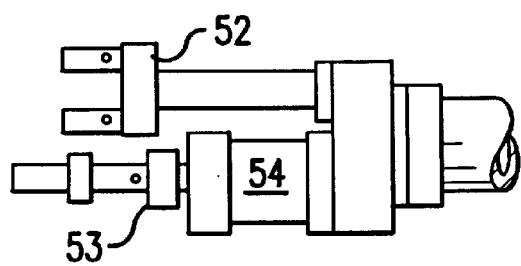
FIG. 13 shows a double-action tool for the perforation of double or single perforation lines.

FIG. 13 shows a multiple perforation tool having a mono perforation tool 53 and a tandem perforation tool 52. The tools 52 and 53 can be brought alternatively and selectively into an operating setting, so that a single perforation line 45" or two equidistantly running perforation lines 45, 45' can be selectively introduced into the protective film. The mono perforation tool 53 can be moved forward in front of the tandem tool 52 by means of a lifting cylinder 54, so that in this position, indicated in dash-dot representation, it is operative. In the withdrawn position represented in solid lines, the tandem tool 52 is operative.

Figure 11:
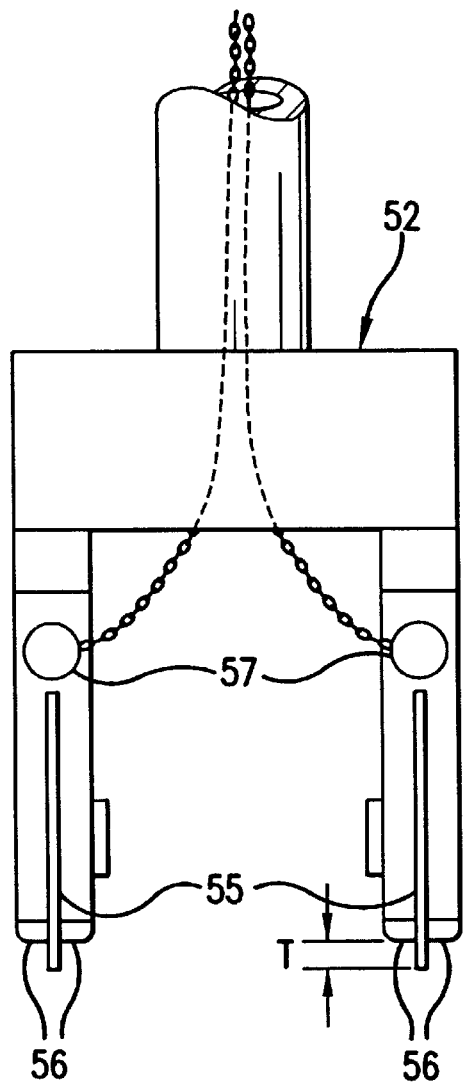
FIGS. 11 and 12 show two different side views of a tandem perforation tool, by which two equidistant perforation lines can be introduced simultaneously into the protective film which is held ready for use in tensioned state.
Figure 12:
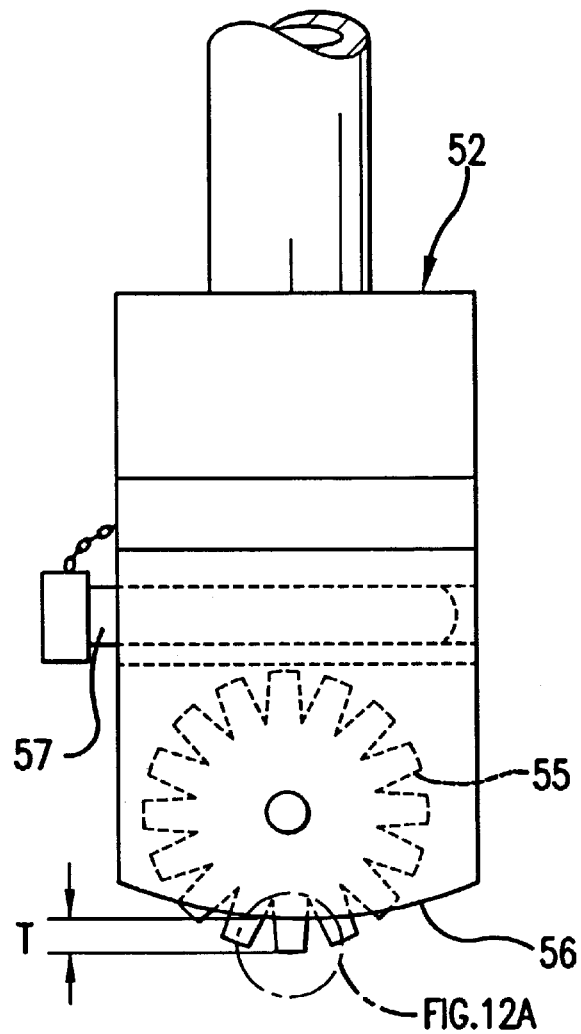
Figure 12A:
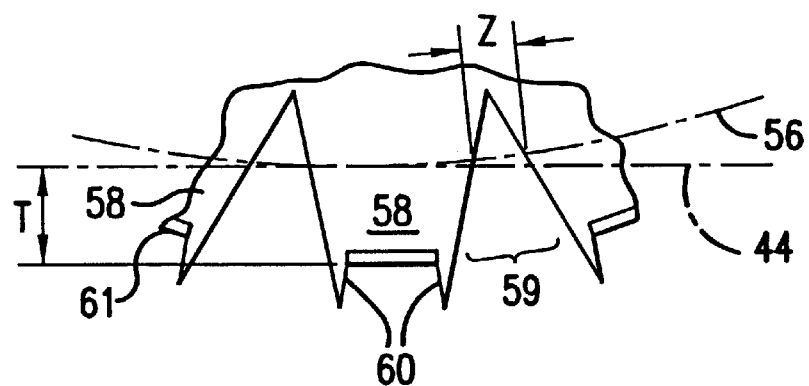

It is even expedient, already in the tandem perforation tool according to FIGS. 11 and 12, to mount one of the two serrated discs according to the model of FIG. 13 such that it is displaceable between two end positions. In one end position both serrated wheels and the associated glide shoes are identically positioned, and in the other end position the serrated wheels are vertically offset. In the adjustment setting exhibiting identically positioned serrated wheels, two equidistant perforation lines can be drawn, whereas, when the serrated wheels are in a vertically offset setting, only the exposed serrated wheel becomes operative; in this adjustment setting, mono perforation lines can be introduced. The advantage of such a perforation tool lies not only in reduced structural complexity, but especially in its compact construction, which is particularly important in cases where film cuts are perforated close to the edge of a sheet which is stretched in the tensioning frame.

To allow the spacing between the perforation lines to be adjusted by the tandem perforation tool, it is expedient if the mounting of at least one of the two serrated discs 55 can be fixed in different spacing positions relative to the other serrated disc in the tandem tool. This can be effected, for example, by the use of shims or by a screw connection in which long holes are used.

Due to frequent and not inconsiderable temperature fluctuations of the heated perforation tool (heating-up at the start of the work, cooling-down during work stoppages) there is the risk that screw connections on this tool will come loose, which will lead to breakdowns. The screw connections in the region of the perforation tool must therefore be temperature-stable and secured against thermally induced loosening. Alternatively, the workpiece division and the screw connections—insofar as constructionally possible—must be moved into a region in which there is no warming of the perforation tool.

In the event of any damage, in order to be able rapidly to continue working on a perforation tool, the connections of the tool 52 to the robot arm 51 are simply configured and are designed for rapid detachment and assembly. The same also applies to the line connections to the tools, which are configured as plug-in connections. Of course, at least one intact perforation tool has to be kept ready, in grip-proper state, for each perforation robot.

Since both the perforation robot 50 and the cut-open robot 80, perform spatially complicated movements and severe arm and hand rotations, the lines leading to the robot tools are heavily stressed. In order to minimize the risk of a line defect, it is expedient to provide at the hinge points rotary transmission elements for the individual lines, the axes of which lie parallel or concentric to the respective axes of the robot arm.

A reliable perforation of the film depends upon the configuration of the toothed circumference of the serrated disc 55 of the perforation tool. More precisely, on the circumference of the serrated disc there are fitted a plurality of teeth 58 of about 3 to 8 mm circumferential extent, which are spaced apart by deeply indented tooth spaces 59. The tooth spaces spring back behind the glide shoes 56 of the tool. Consequently, only the teeth 58 pierce the protective film. To the front and rear end of every tooth 58 of the serrated disc there is respectively moulded a pointedly tapered pin 60 of at least about 2 mm radial extent and the back of the tooth located between the two pins of a tooth is respectively provided with a cutter-like sharpening 61. The width Z of the tooth gaps 59 on the circumference of the serrated disc at the level of the glide shoes measures roughly 1 to 3 mm. This measure determines the length of the remaining residual crosssections in the perforated film. From case to case, this measure must likewise be refined by tests. On the one hand, the residual cross-sections which remain after the perforation must not be too small, so that the perforated film is still reliably able to be worked on, i.e. further perforated and also safely handled. On the other hand, the residual cross-sections should be small enough so that those film pieces which have to be removed as a condition of the assembly can also reliably be torn off along the perforation lines without the remaining film coming loose from the body or starting to tear during draw-off.

For perforating closed contour lines of small measurement (e.g. small circles, rectangles or the like), crown-like-shaped perforation stamps, which can likewise be heated, can also be used. Their serrated rim is expediently shaped in similar fashion to the serrated disc 55. The serrated rim is surrounded at least on the outside by a relatively cold stop ring, which is staggered by a certain measure relative to the tips of the serrations, and which limits the depth of penetration of the serrated rim into the film, thus defining the level of perforation. Possible applications for smaller, self-enclosed contour lines of this kind are cut-outs for smaller add-on parts such as antennae, wash-water nozzles, door handles, corporate emblems or the like.

Figure 14:
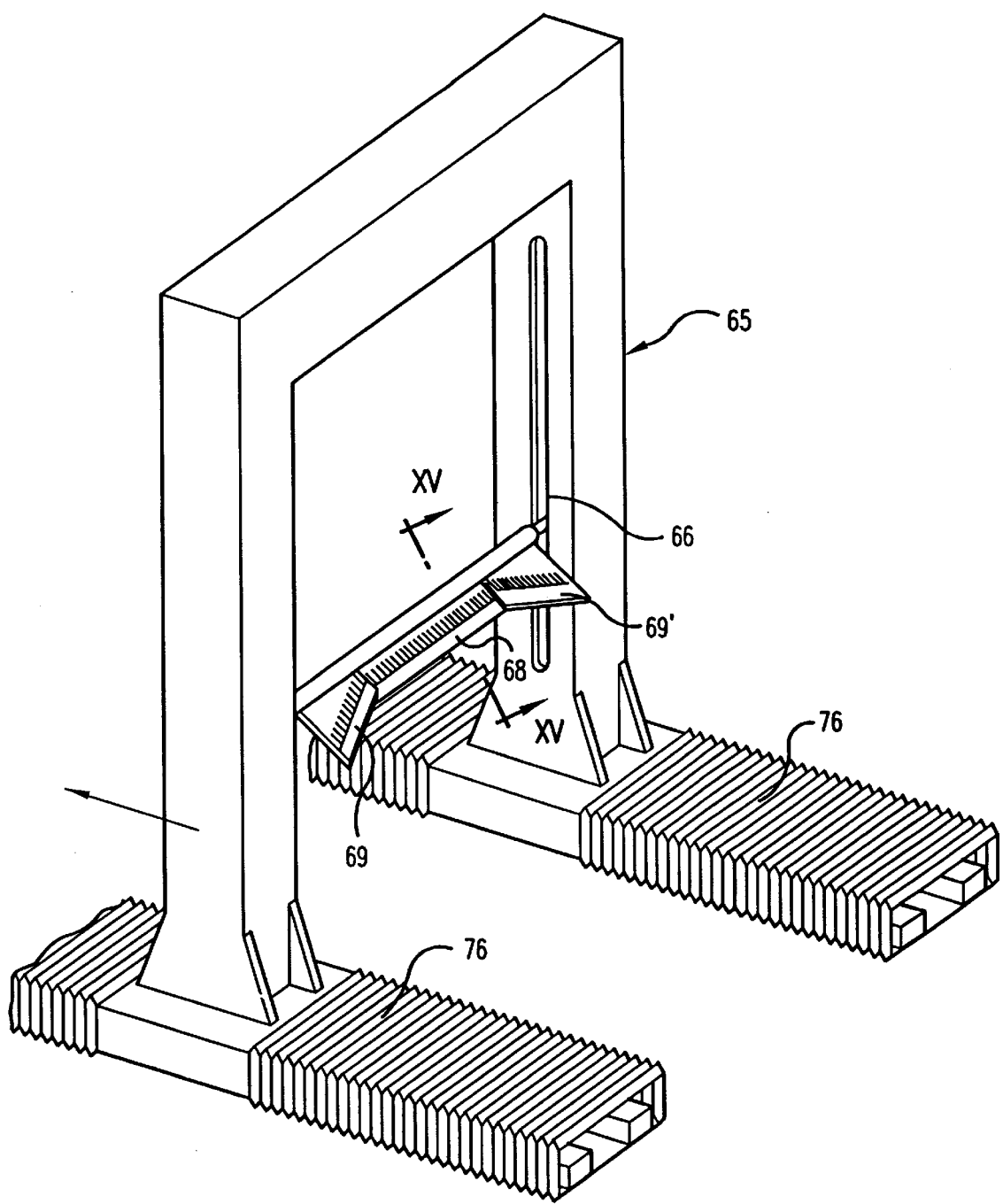
FIG. 14 shows an oblique view of a displaceable, body-spanning gantry, having a vertically movable smoothing bar for pressing down the applied protective film.

In the pressing station 14 adjoining the lining stations 12 and 13 and an empty station 15 (interposed for safety's sake), the perforated protective film pieces, which are applied loosely but free from creases to the body, are pressed jointly down onto the surface sections, so that their adhesion improves. A gantry 65 (FIG. 14) is provided for this purpose in the pressing station 14, which gantry spans the vehicle body and is displaceable in the longitudinal direction of the vehicle body on a floor runner 76 equipped with a corresponding drive system. Within the opening of the gantry, an elastic and slidable smoothing bar 67, which is roughly matched in its shape to the cross-sectional contour of the surface sections to be smoothed, extends horizontally over the whole of the vehicle width. For contour-matching purposes, the smoothing bar is composed of a rectilinear, middle bar portion 68 and two inversely inclined, lateral bar portions 69 and 69'. The smoothing bar 67 is movable up and down in a vertical runner 66 without tilting right to left. At the same time, it maintains its set inclination to the vehicle longitudinal axis (see FIG. 15). In addition, the gantry 65 is equipped with a lift drive for the smoothing bar, by which the smoothing bar can be raised and carefully lowered onto the body. When lowered onto the body, the smoothing bar rests loosely on the vehicle body at any height with a defined force, and hence presses the films down onto the body. This contact pressure is produced due to gravity by the natural weight of the smoothing bar and by any additional weights accommodated in the vertical runner. The smoothing bar is capable of automatically following the longitudinal contour of the body as the gantry passes over it.

In the represented illustrative embodiment (FIG. 15), the supporting part of the smoothing bar is formed by an angled profile 70, to which a stiff felt strip 73 of about 15 mm thickness and about 20 cm width is screwed. On the top side, for the stiffening of the felt, a plastics moulding 74 made from a fibre-reinforced elastic synthetic material is interposed between the angled profile 70 and the felt bead 73, the exposed side of the plastics moulding being toothed in a comb-like manner by a multiplicity of closely adjacent indentations 75 and consequently being reduced in its ductility at the exposed edge. Moreover, the smoothing bar can also thereby more easily spatially distort and can thus more easily adapt to different body-side contours.

For the pressing-down of the protective film, the gantry 65 begins at the front starting position indicated in dash-dot representation in FIG. 2. There the smoothing bar is lowered onto the front of the body and the gantry travels rearwards in the longitudinal direction over the fixed-held body, with weighted smoothing bar resting loosely on the body, and so presses down the loosely applied protective film. If the end of the hood is reached, then the gantry raises the smoothing bar to roof level and carefully re-lowers it at the beginning of the roof; pressing-down is then continued against the roof film. In the transition from the roof to the rear lid, the smoothing bar is again carefully shifted and there too the pressing operation is continued. Towards the end of the rear lid, the smoothing bar is fully raised and the gantry returns, with smoothing bar raised, into the front starting position (indicated in dash-dot representation) and there awaits the next body with smoothing bar raised.

Following on from the pressing station 14, a cut-open station 16 is provided, in which covered-over joints 6 can be cut free by automation in the direction of movable body parts.

A first illustrative embodiment of an apparatus according to the invention is represented in FIG. 16. The apparatus according to the invention comprises a freely programmable industrial "cutting robot", having preferably six degrees of freedom for an operating arm 81, and having a further seventh motional axis for the transport of the cutting robot along a floor runner of the production line. Not only because of the measuring exercise, but also because of the covered-over joints which are located at the front and rear of the vehicle body and at which the film has to be cut open, the cutting robot is equipped with a transport shaft 89 along the said floor runner. Alternatively, this function can be performed by one or more stationary cutting robots without any seventh motional axes, where the robots have to work only on part-regions of the body.

In the illustrative embodiment represented in FIG. 16, the operating arm 81 of the cutting robot has a cutting and pressing tool 83 and a measuring tool which can be swivelled into a variety of operating settings. As the bodies are conveyed from station to station, the actual position of the bodies, despite a mechanical fixing of the conveyor slides against station-side lateral and longitudinal stops, strays within a field of tolerance which is inadmissibly large for the free-cutting of the joints. These position tolerances of the body are additionally overlaid by certain natural tolerances of the body itself, which though, in themselves, substantially less than the position tolerances, are not totally negligible in the cutting-free of the joints. Before the joints of the body are cut free, their precise actual position in relation to the cut-open robot must therefore firstly be determined at a small number of body points front and rear. This measuring of the actual position of the joints can be effected by a stationary, three-dimensional-working measuring system.

In the represented illustrative embodiment, this actual position determination of the joints 6 is likewise effected by the cutting robot 80 itself, which in this case operates as a measuring robot. In a first swivel setting the measuring tool 82 is operative, by which the precise actual position of the body 1 and of the joints 6 in relation to the cutting robot can be detected. That tool part which becomes operative in the second swivel setting of the dual-purpose tool is configured as a cutting and pressing tool 83, which has a knife 79 for cutting through the protective film 23 in the joint region (FIG. 17*c*) and a rotary brush 87 for pressing down the cut edges. The knife 79 comprises a blade 84 and a blade mounting 94, so that the blade 84 can be easily changed. The rotary brush 87 can be driven from an electric motor 88 via a speed-reducing mitre gear. As an alternative to the represented rotary brush 87, an air nozzle which emits an air current directed at the cut edges can also be used to press the cut edges down.

The knife 84 is elastically suspended transversely to the direction of cutting and movement by means of a leaf spring 85, so that it can automatically follow any positional deviations of the joint from the guide path which is predetermined on the robot side. To prevent the knife, on the other hand, from being able to veer unacceptably to the side, the motional play is constricted by a pair of stop arms 86 reaching over the knife on both sides, the motional play being able to be predetermined by adjusting screws 92. When the knife is inserted into the joint, a clear position of the knife must however be ensured and the motional play eliminated. For this reason, the stop arms which are pivotable about a swivel axis 91 can be moved together by means of a small pneumatic cylinder 90, which acts via an expanding wedge upon the opposing lever arms, and the knife can be clamped between them in a positionally defined arrangement, this being temporarily effected as the knife is inserted into a joint. The mounting of the knife 79 on the leaf spring 85 is also shown in FIGS. 3a (side view) and 3b (front view). The adjusting screws 92 are not shown in FIGS. 3a and 3b in order to simplify the representation.

In order to protect the paintwork in the joint region from scratches caused by the blade 84 of the knife 79 sweeping through, the two flat sides of the blade are provided with a plastic coating 93, which coating prevents direct contact of the hard blade material with the paintwork (FIGS. 2a–2c). The plastic 93 applied to both sides of the blade 84 should have good sliding characteristics in relation to hardened vehicle paints and in relation to the film 23 to be applied. As far as the coating thickness and wear-resistance of the coating plastic 93 is concerned, then the coating should achieve at least the tool life of the knife blade 84, even if it is repeatedly reground. For reasons of sharpening of the blade 84, the plastic coating 93 of the blade 84 is set back relative to the cutting edge 99.

It is also worth mentioning in connection with the cutting tool 83 that, with regard to rational working, rapid changing of the knives 79 must here be possible, since these knives, because of the large lengths of film to be cut open, are prone to a corresponding amount of wear. Expediently, measures to increase tool life are also adopted here, such as better knife material, hard coating of the cutter or higher wearing material reserves, for example through the use of rotatable round knives. For the sake of completeness, it is again worth mentioning in connection with this robot tool that it must be rapidly replaced in the event of damage and all connections of a mechanical, electrical or fluidic nature must be designed for rapid changing. The measuring tool 82, alone, should also be able to be rapidly replaced within the double-action tool 82/83.

Figure 19:
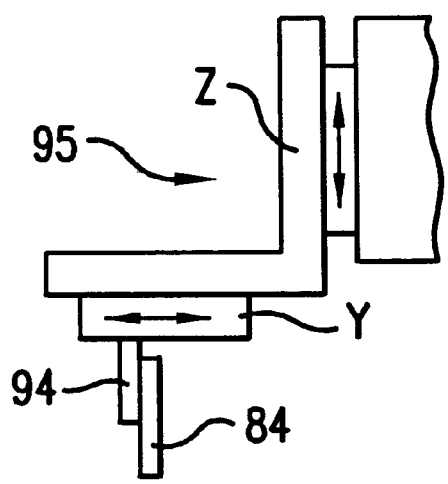
FIG. 19 shows a diagrammatic representation of a mounting, according to the invention, of a knife, using a biaxial floating slide.

FIG. 19 is a diagram which shows the mounting of the knife 79 on a biaxial floating slide 95, which is disposed on the operating arm 81 of the cutting robot. The biaxial floating slide 95 comprises a z-slide Z, which is transportable perpendicularly to the film plane, and a y-slide Y, which is transportable perpendicularly to the z-slide Z and transversely to the cutting and motion direction. On the y-slide Y is disposed the knife 79 for cutting through the protective film 23. The pressing tool (rotary brush 87) is not reproduced in the representation of FIG. 19 for reasons of clarity. It can likewise be fitted on the y-slide, behind the knife 79 in the cutting and motion direction, or even, since it has sufficient width to cover possible tolerances, directly on the operating arm 81.

Figure 18A:
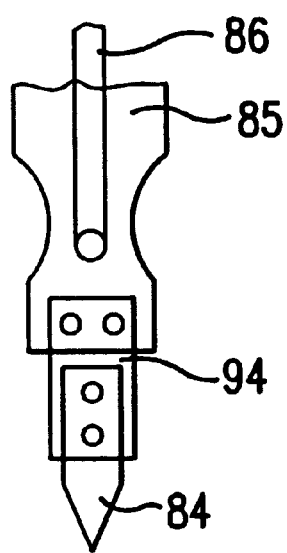
FIGS. 18a and 18b show a diagrammatic representation in side and front view of the mounting, according to the invention, of a knife, using a leaf spring.
Figure 18B:
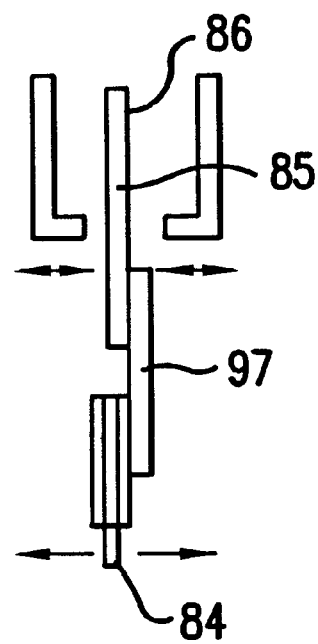

During operation, following the determination of the insertion point by a suitable measuring device of the cutting robot, the z-slide Z is fixed, so that the operating arm has only a defined short distance remaining to travel in the z-direction in order to pierce the protective film. Advantageously, the y-slide Y is likewise fixed during the insertion, but is released prior to commencement of the cutting operation so that, through its floating motion in the y-direction, it is able to compensate for any joint tolerances or deviations in the course of the joint from the desired position, with the knife blade 84, in each setting of the y-slide Y, remaining perpendicular to the film plane. The arrangement of the knife 79 on the described biaxial floating slide 95 can be effected with or without the mounting on a leaf spring and with or without the further components, as have been described above with reference to FIGS. 16–18. Naturally, a mounting of the knife 79 on a single-axis floating slide which is active only in the y-direction also adequately meets the defined requirements.

Figure 20A:
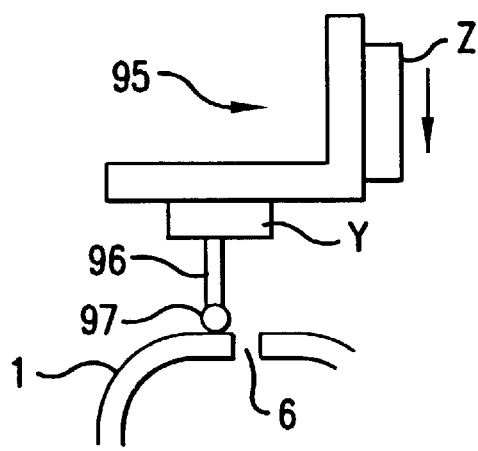
FIGS. 20a and 20b show, in diagrammatic representation, a measuring device according to the invention, having a tactile probe, during the search travel in a motion transversely to a joint.
Figure 20B:
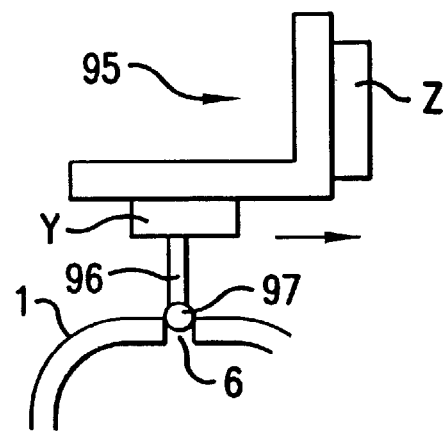

FIGS. 20a and 20b show a measuring device according to the invention, by means of which the insertion position of the knife blade 84 can be determined. To this end, a tactile probe 96 having a rounded feeler tip 97 is disposed on a biaxial floating slide 95, as described above with reference to FIG. 19, on the y-slide Y essentially perpendicular to the film plane. In order to locate the joint 6 to be cut free, the biaxial floating slide 95 fastened to the operating arm 81 is lowered in the direction of the body 1 until the feeler tip 97 of the probe 96 touches the body 1 (FIG. 5a).

The cutting robot then performs with its operating arm 81 a motion running essentially transversely to the alignment of the joint 6 to be determined, until the feeler tip 97 of the tactile probe 96 engages with the joint 6. This is registered by the fact that, upon further motion of the biaxial floating slide 95, the y-slide Y experiences and indicates a deflection. The setting of the y-slide Y thus determined is then used to determine the actual position of the joint 6 and to insert the knife 79 through the protective film 23.

Advantageously, the knife 79 is disposed in alignment behind the tactile probe 96 in the cutting and motion direction, specifically on the y-slide Y. To this end, both the tactile probe 96 and the knife 79 are separately adjustable in the z-direction, so that, by extending the knife 79 in the z-direction, the protective film is pierced, and once the tactile probe 96 has been moved upwards, also in the z-direction, the cutting operation can commence. Alternatively, the deflection of the y-slide Y relative to the desired position stored in the cutting robot can be determined and the point of insertion of the knife correspondingly corrected.

Figure 21:
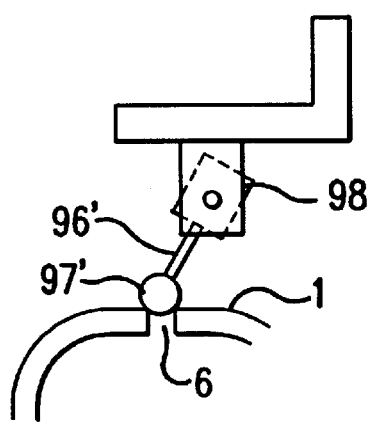
FIG. 21 shows a measuring device according to the invention, having a tactile probe disposed such that it can be swivelled transversely to the direction of the joint.

Another option for a measuring device for the location of the joint 6 to be cut fee is represented in FIG. 21. In this embodiment, a probe 96' having a feeler roll 97' is connected to a tactile measuring system. The probe 96' is connected by a suitable mounting to the operating arm 81 of the cutting robot, it being disposed on the mounting 98 such that it can be pivoted transversely to the cutting and motion direction.

In order to locate the joint 6 to be cut free, the probe 96', as described above, is lowered onto the body 1 and is transported essentially transversely to the joint 6 to be detected. As soon as the feeler roll 97' ofthe probe 96' engages with the joint 6, upon further motion of the operating arm 81, a pivoting of the probe 96' occurs, which is registered on the mounting 98 by means of a suitable sensor. The operating arm 81 completes its motion running essentially transversely to the joint 6 and the setting of the probe 96' is stored as a position of insertion for the knife 79. Afterwards, the probe 96' is moved back/swivelled back out of its position acting upon the body 1 and the cutting and pressing tool is brought into its operating setting. The knife blade 84 is then used to pierce the protective film 23 at the stored position.

Of course, it is also possible on the probe 96' represented in FIG. 21 to use a rounded feeler tip (FIG. 20), in precisely the same way as the feeler roll 97'.

Figure 22:
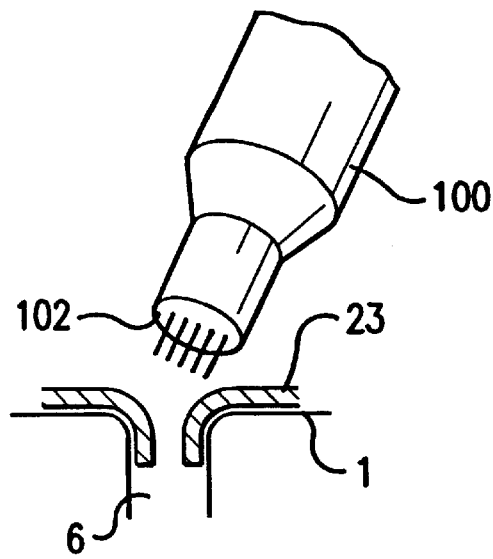
FIG. 22 shows, in heavily diagrammatized representation, the cutting, according to the invention, of a protective film in the region of a stuck-over joint, using a hot-air nozzle.

FIG. 22 is a schematic representation of a further illustrative embodiment of an apparatus according to the invention for cutting through protective film, which comprises an air nozzle 100 having an air-discharge opening 102. The air nozzle is disposed on an operating arm (not represented in more detail) of a described cutting robot. The air nozzle 100 is aligned with its air-discharge opening essentially perpendicular to the body surface; and, while distanced from the body 1 by means of the operating arm of the cutting robot, it is moved along over a joint 6 which has been covered over with protective film 23 and is to be cut free.

The air nozzle 100 emits through its air-discharge opening 102 a diffuse jet of air, which is illustrated by the arrows of FIG. 22. The temperature of the air issuing from the air-discharge opening 102 is chosen such that, in interaction with the discharge velocity of the air (i.e. the pressure exerted by the air upon the film), the plastic is softened and then cut through. In the embodiment of the invention, a person skilled in the art will therefore mutually coordinate the interacting parameters of temperature, pressure, nozzle shape and nozzle distance from the protective film. In the case of a very diffuse air current with relatively low pressure, the temperature of the discharged air therefore corresponds at least to the melting temperature of the plastic of the protective film 23 (>140° C.) . In the tests carried out by the Applicant, the temperature amounted to about 100° C. to 160° C. combined with a pressure of 6 to 1 bar. The motion of the air nozzle 100 is effected at a speed which is sufficiently slow that the plastic in the region of the joint 6 is cut through by the warming (softening or melting) and influence of the air current, so that, once the motional sequence of the air nozzle 100 along the joint 6 is completed, the latter is cut free.

Figure 7:
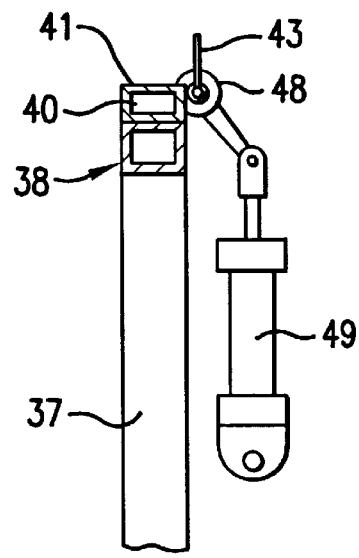
FIG. 7 shows a cross-section through the leading suction bar of the tensioning frame according to FIG. 6, along the sectional line VII—VII, showing additional gripping elements.

The advantage of the cut-through device represented in FIG. 7 is that no separate pressing tool is necessary, since the cut edges of the protective film 23 are not only cut through by the air current, but are simultaneously pressed down onto the body 1. Nor is there any need for an additional measuring device for finely determining the gap position, since possible tolerances of the precise course of the joint are compensated by the diffuse air current.

In order to cut open protective film which is covering a bead of the body, a pin made from a material offering good thermal conductivity can advantageously be disposed in the region in front of the air-discharge opening 102 of the air nozzle 100, which pin is used to pierce the protective film 23 whenever the bead is so wide that the protective film 23 cannot be cut through by the pulse exerted by the air current. The piercing of the protective film 23 by the pin is effected, for example, by corresponding lowering of the air nozzle 100. Advantageously, the pin is disposed extendably on the air nozzle 100, so that the distance between the protective film and the air nozzle does not have to be changed for the piercing of the protective film with the pin.

Using the described plant, bodies of different vehicle types in the production mix are easily able to be lined with protective films provided that minor supplementary fittings are provided for this purpose in the stations. More precisely, at least in the first work station, an automatic identification device needs to be installed, which starts up a data carrier transported with the bodies and determines from this the body type. By way of example, this can be effected by a barcode label transported on the bodies and by a barcode reader in the entrance region of the work station. Other information carriers are also suitable for this purpose. With the passage of the bodies from work station to work station, this information can be passed in stages through the work line. That body type which is respectively located in the station must be suitably fed into the robot control system of each individual work station. In addition, in the robot control systems, a selection of programs must be held ready for use for the treatment of the different body types, which programs can be quickly and automatically changed.

In order to make the production line more flexible with regard to a production mix, the tensioning frames 37, 37' and 37" do not necessarily need to be variable in width; rather, they can be designed in this respect to the widest body type. In the case of narrower bodies, the protective film then extends somewhat farther into the side wall, which is not harmful. If it is wished to prevent this, then, where films of differing width are used for bodies of differing width, the suction bars would have to be equipped with connectable chambers in the marginal region, so that the vacuum can become operative to different widths. In order also to be able to serve different lengths of surface sections with the same tensioning frame, the rear suction bar of the tensioning frame can expediently be transported into different positions by means of operating cylinders, thereby enabling different frame lengths to be set.

In the case of notchback vehicles, there are generally three surface sections to be protected, namely the hood 3, roof 5 and rear lid 4, which, in different body types, can differ in width and/or length. In the case of estate cars, the roof is significantly longer, so that this lengthening can only poorly be achieved through an expansion of the tensioning frame. Once however, in estate cars, the rear lid is no longer present, so that where the requirement exists for a mixed production also of estate cars, there is the possibility of lining the longer roof of estate cars with two film portions in overlapping arrangement—starting from the rear frontwards—and of using for this purpose the tensioning frames for roof and rear lid for the conventional notchback saloons.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for cutting through a protective film at a location of covered-over joints and beads on a passenger vehicle body by means of a freely programmable cutting robot having at least five degrees of motional freedom, said cutting robot has a cutting tool disposed on an operating arm thereof, which process comprises:

said cutting tool piercing the protective film at one end of a joint or bead to be cut free;

through a motion of the cutting tool along a cutting and motion direction coinciding with a course of the joint or bead, said cutting tool cutting through the protective film over substantially its entire length; and pressing the cut edges of the cut-through protective film onto the body by means of a pressing tool disposed downstream of the cutting tool on the operating arm.

2. Process according to claim 1, wherein a knife is provided as the cutting tool, and the pressing tool is a tool selected from the group consisting of a rotary brush and an air nozzle.

3. Process according to claim 1, wherein:

at a moment when it pierces the protective film, the cutting tool is held in defined alignment in relation to the operating arm; and during the cutting operation, when the cutting tool touches body parts limiting the joint or bead, it is held such that it yields transversely to the cutting and motion direction.

4. Process according to claim 1, wherein the cutting tool is withdrawn from its position in which it pierces the protective film when it encounters an obstacle during the cutting operation.

5. Process according to claim 1, wherein prior to the cutting operation, an actual position of the joint to be cut free is established by means of a suitable measuring device assigned to said cutting and pressing tools.

6. Process according to claim 5, wherein to establish the actual position of the joint to be cut free, a probe disposed on the operating arm is lowered onto the body in proximity to a first end of the joint to be cut free and is transported substantially transversely to the joint until it engages in the joint.

7. Process according to claim 6, wherein a determined position of the probe is stored by the cutting robot and, when the probe has been recovered, the cutting tool is used to pierce the protective film at the stored position.

8. Process according to claim 6, wherein the cutting tool is disposed in alignment with the probe and, when the probe has engaged in the joint to be cut free, the cutting tool is moved out and used to pierce the protective film.

9. Process for cutting through a protective film of plastic at a location of covered-over joints and beads on a passenger vehicle body by means of a freely programmable cutting robot having at least five degrees of motional freedom, which process comprises:

providing a diffuse air jet issuing from an air nozzle disposed on an operating arm of said cutting robot, the temperature of said air jet corresponding at least to a melting temperature of the plastic of the protective film; and directing said air jet onto a location of said covered-over joints or beads, said air jet simultaneously cutting through the protective film and pressing its cut edges against the body.

10. Process according to claim 9, wherein a pin made from a material having good thermal conductivity is disposed in a region in front of an air-discharge opening of the air nozzle, said pin is extended as a bead is cut free and is used to pierce the protective film spanning the bead.

11. Apparatus for cutting through protective film at a location of covered-over joints and beads on a passenger vehicle body, comprising:

a freely programmable cutting robot having at least five degrees of motional freedom;

an operating arm on said cutting robot;

a cutting and pressing tool mounted on said operating arm, said cutting and pressing tool has a knife with a blade for cutting through the protective film at a location of covered-over joints and beads, together with a rotary brush or an air nozzle for pressing down the cut edges.

12. Apparatus according to claim 11, wherein flat sides of a blade of the knife have a plastic coating.

13. Apparatus according to claim 11, wherein the knife in the cutting and pressing tool is elastically suspended by means of a leaf spring transversely to the cutting and motion direction.

14. Apparatus according to claim 13, further comprising adjustable stop arms for acting upon at least one of the knife and the leaf spring transversely to the cutting and motion direction.

15. Apparatus according to claim 11, wherein the knife can be pivoted rearwards in the cutting direction when it encounters an obstacle during the cutting operation.

16. Apparatus according to claim 11, wherein the knife is disposed on a biaxial floating slide and is adjustable perpendicularly to the film plane and transversely to the cutting and motion direction.

17. Apparatus according to claim 11, wherein:

the cutting and pressing tool can be moved into a plurality of operating settings; and a measuring device is provided, which is assigned to the cutting and pressing tool, for registering within a working space of the cutting robot an actual position of the joint or bead of the vehicle body, and said joint or bead is to be cut free.

18. Apparatus according to claim 17, wherein:

the measuring device is a measuring tool disposed on the cutting and pressing tool; and the cutting and pressing tool can be pivoted into a plurality of operating settings, in a first of said settings the measuring tool being operative, and in a second of said settings the cutting and pressing tool being operative.

19. Apparatus according to claim 17, wherein a tactile probe, which is adjustable on a biaxial floating slide perpendicularly to the film plane and transversely to the cutting and motion direction, is provided as the measuring device.

20. Apparatus according to claim 19, wherein the knife is disposed in alignment with the tactile probe in a cutting and motion direction, on the biaxial floating slide holding the tactile probe, the tactile probe and the knife being respectively extendable perpendicularly to the film plane.

21. Apparatus according to claim 17, wherein a probe which is pivotable transversely to a cutting and motion direction of the cutting and pressing tool is provided as the measuring device.

22. Apparatus according to claim 19, wherein the probe has a rounded feeler tip.

23. Apparatus according to claim 19, wherein the probe has a feeler tip with a feeler roll having a size which is matched to the gap.

24. Apparatus according to claim 17, wherein the measuring device comprises at least one of optical, acoustic and inductive sensors, for detecting measuring points disposed along the body, to determine a deviation of an actual position of the body from a desired position thereof.

25. Apparatus for cutting through a protective film at a location of covered-over joints and beads on a passenger vehicle body, comprising:

a freely programmable cutting robot having at least five degrees of motional freedom;

an operating arm disposed on said robot; and an air nozzle mounted on said operating arm, for diffuse emission of hot air.

26. Apparatus according to claim 25, further comprising a pin disposed in a region in front of an air-discharge opening of the air nozzle, said pin is made from a thermally conductive material.

* * * * *